United States Patent
Neumeier et al.

(10) Patent No.: US 11,039,178 B2
(45) Date of Patent: *Jun. 15, 2021

(54) MONITORING INDIVIDUAL VIEWING OF TELEVISION EVENTS USING TRACKING PIXELS AND COOKIES

(71) Applicant: INSCAPE DATA, INC., Irvine, CA (US)

(72) Inventors: Zeev Neumeier, Berkeley, CA (US); Michael Collette, San Rafael, CA (US); W. Leo Hoarty, Morgan Hill, CA (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,663

(22) Filed: Apr. 9, 2019

(65) Prior Publication Data

US 2019/0306545 A1 Oct. 3, 2019

Related U.S. Application Data

(63) Continuation of application No. 15/796,706, filed on Oct. 27, 2017, now Pat. No. 10,306,274, which is a
(Continued)

(51) Int. Cl.
*H04N 7/025* (2006.01)
*H04N 21/234* (2011.01)
(Continued)

(52) U.S. Cl.
CPC ... *H04N 21/23418* (2013.01); *G06F 16/5838* (2019.01); *G06F 16/735* (2019.01);
(Continued)

(58) Field of Classification Search
CPC ............ H04N 21/2347; H04N 21/237; H04N 21/258; H04N 21/439; H04N 21/445;
(Continued)

(56) References Cited

U.S. PATENT DOCUMENTS

| 4,677,466 A | 6/1987 | Lert, Jr. et al. |
| 4,697,209 A | 9/1987 | Kiewit et al. |

(Continued)

FOREIGN PATENT DOCUMENTS

| CA | 2501316 | 9/2005 |
| CN | 1557096 | 12/2004 |

(Continued)

OTHER PUBLICATIONS

International Search Report and Written Opinion dated Mar. 31, 2015 for PCT Application No. PCT/US2014/072255, 8 pages.
(Continued)

*Primary Examiner* — Jivka A Rabovianski
(74) *Attorney, Agent, or Firm* — Polsinelli LLP

(57) ABSTRACT

A real-time content identification and tracking system enabling monitoring of television programming consumption specific to an individual television or other viewing device. Metrics collected may include data regarding viewing of specific broadcast media, commercial messages, interactive on-screen information or other programming, as well as locally cached, time-shifted programming. Information about media consumption by such specific television sets or other viewing means may be returned to a commercial client of the system through a trusted third-party intermediary service and, in certain embodiments, encoded tokens may be used to manage the display of certain events as well as to enable robust auditing of each involved party's contractual performance.

19 Claims, 9 Drawing Sheets

Related U.S. Application Data continuation of application No. 14/763,158, filed as application No. PCT/US2014/072255 on Dec. 23, 2014, now Pat. No. 9,838,753, said application No. 14/763,158 is a continuation-in-part of application No. 14/551,933, filed on Nov. 24, 2014, now Pat. No. 9,906,834.

(60) Provisional application No. 61/920,086, filed on Dec. 23, 2013.

(51) Int. Cl.

| | | |
|---|---|---|
| *H04N 21/61* | (2011.01) | |
| *H04N 21/258* | (2011.01) | |
| *H04N 21/2347* | (2011.01) | |
| *H04N 21/237* | (2011.01) | |
| *H04N 21/442* | (2011.01) | |
| *H04N 21/858* | (2011.01) | |
| *H04N 21/81* | (2011.01) | |
| *G06F 16/735* | (2019.01) | |
| *G06F 16/583* | (2019.01) | |
| *G06F 16/783* | (2019.01) | |
| *G06F 16/955* | (2019.01) | |
| *G06Q 30/02* | (2012.01) | |
| *H04N 21/845* | (2011.01) | |
| *H04N 21/47* | (2011.01) | |
| *H04N 21/431* | (2011.01) | |
| *H04N 21/262* | (2011.01) | |
| *H04N 21/439* | (2011.01) | |
| *H04N 21/44* | (2011.01) | |
| *H04N 21/45* | (2011.01) | |
| *H04N 21/462* | (2011.01) | |
| *H04N 21/466* | (2011.01) | |
| *H04N 21/478* | (2011.01) | |

(52) U.S. Cl.
CPC ...... *G06F 16/7847* (2019.01); *G06F 16/9566* (2019.01); *G06Q 30/0242* (2013.01); *G06Q 30/0261* (2013.01); *G06Q 30/0269* (2013.01); *G06Q 30/0273* (2013.01); *G06Q 30/0277* (2013.01); *H04N 21/237* (2013.01); *H04N 21/2347* (2013.01); *H04N 21/25841* (2013.01); *H04N 21/26241* (2013.01); *H04N 21/4316* (2013.01); *H04N 21/4394* (2013.01); *H04N 21/44008* (2013.01); *H04N 21/44204* (2013.01); *H04N 21/44213* (2013.01); *H04N 21/4532* (2013.01); *H04N 21/462* (2013.01); *H04N 21/4667* (2013.01); *H04N 21/47* (2013.01); *H04N 21/6125* (2013.01); *H04N 21/6175* (2013.01); *H04N 21/812* (2013.01); *H04N 21/8126* (2013.01); *H04N 21/8456* (2013.01); *H04N 21/8586* (2013.01); *H04N 21/478* (2013.01)

(58) Field of Classification Search
CPC .. H04N 21/233; H04N 21/234; H04N 21/854; H04N 21/858
USPC .................. 725/34, 100, 136, 137
See application file for complete search history.

(56) References Cited

U.S. PATENT DOCUMENTS

| | | |
|---|---|---|
| 4,739,398 A | 4/1988 | Thomas et al. |
| 5,019,899 A | 5/1991 | Boles et al. |
| 5,193,001 A | 3/1993 | Kerdranvrat |
| 5,210,820 A | 5/1993 | Kenyon |
| 5,319,453 A | 6/1994 | Copriviza et al. |
| 5,436,653 A | 7/1995 | Ellis et al. |
| 5,481,294 A | 1/1996 | Thomas et al. |
| 5,557,334 A | 9/1996 | Legate |
| 5,572,246 A | 11/1996 | Ellis et al. |
| 5,812,286 A | 9/1998 | Li |
| 5,826,165 A | 10/1998 | Echeita et al. |
| 5,918,223 A | 6/1999 | Blum et al. |
| 6,008,802 A | 12/1999 | Goldschmidt et al. |
| 6,025,837 A | 2/2000 | Matthews, III et al. |
| 6,035,177 A | 3/2000 | Moses et al. |
| 6,064,764 A | 5/2000 | Bhaskaran et al. |
| 6,298,482 B1 | 10/2001 | Seidman |
| 6,381,362 B1 | 4/2002 | Deshpande et al. |
| 6,415,438 B1 | 7/2002 | Blackketter et al. |
| 6,463,585 B1 | 10/2002 | Hendricks et al. |
| 6,469,749 B1 | 10/2002 | Dimitrova |
| 6,577,346 B1 | 6/2003 | Perlman |
| 6,577,405 B2 | 6/2003 | Kranz et al. |
| 6,628,801 B2 | 9/2003 | Powell et al. |
| 6,647,548 B1 | 11/2003 | Lu et al. |
| 6,675,174 B1 | 1/2004 | Bolle et al. |
| 6,771,316 B1 | 8/2004 | Iggulden |
| 6,804,659 B1 | 10/2004 | Graham et al. |
| 6,978,470 B2 | 12/2005 | Swix et al. |
| 6,990,453 B2 | 1/2006 | Wang et al. |
| 7,028,327 B1 | 4/2006 | Dougherty et al. |
| 7,039,930 B1 | 5/2006 | Goodman et al. |
| 7,050,068 B1 | 5/2006 | Bastos et al. |
| 7,051,351 B2 | 5/2006 | Goldman et al. |
| 7,064,796 B2 | 6/2006 | Roy et al. |
| 7,089,575 B2 | 8/2006 | Agnihotri et al. |
| 7,098,959 B2 | 8/2006 | Mishima et al. |
| 7,136,875 B2 | 11/2006 | Anderson et al. |
| 7,178,106 B2 | 2/2007 | Lamkin et al. |
| 7,210,157 B2 | 4/2007 | Devara |
| 7,346,512 B2 | 3/2008 | Wang et al. |
| 7,356,830 B1 | 4/2008 | Dimitrova |
| 7,421,723 B2 | 9/2008 | Harkness et al. |
| 7,545,984 B1 | 6/2009 | Kiel et al. |
| 7,590,998 B2 | 9/2009 | Hanley |
| 7,623,823 B2 | 11/2009 | Zito et al. |
| 7,787,696 B2 | 8/2010 | Wilhelm et al. |
| 7,793,318 B2 | 9/2010 | Deng |
| 7,933,451 B2 | 4/2011 | Kloer |
| 8,001,571 B1 | 8/2011 | Schwartz et al. |
| 8,094,872 B1 | 1/2012 | Yagnik et al. |
| 8,171,004 B1 | 5/2012 | Kaminski, Jr. et al. |
| 8,171,030 B2 | 5/2012 | Peira et al. |
| 8,175,413 B1 | 5/2012 | Ioffe et al. |
| 8,189,945 B2 | 5/2012 | Stojancic et al. |
| 8,195,589 B2 | 6/2012 | Bakke et al. |
| 8,195,689 B2 | 6/2012 | Ramanathan et al. |
| 8,229,227 B2 | 7/2012 | Stojancic et al. |
| 8,335,786 B2 | 12/2012 | Peira et al. |
| 8,364,703 B2 | 1/2013 | Ramanathan et al. |
| 8,385,644 B2 | 2/2013 | Stojancic et al. |
| 8,392,789 B2 | 3/2013 | Biscondi et al. |
| 8,494,234 B1 | 7/2013 | Djordjevic et al. |
| 8,522,283 B2 | 8/2013 | Laligand et al. |
| 8,595,781 B2 | 11/2013 | Neumeier et al. |
| 8,619,877 B2 | 12/2013 | McDowell |
| 8,625,902 B2 | 1/2014 | Baheti et al. |
| 8,769,854 B1 | 7/2014 | Battaglia |
| 8,776,105 B2 | 7/2014 | Sinha et al. |
| 8,788,328 B1* | 7/2014 | George ............ G06Q 30/0261 705/14.1 |
| 8,832,723 B2 | 9/2014 | Sinha et al. |
| 8,856,817 B2 | 10/2014 | Sinha et al. |
| 8,893,167 B2 | 11/2014 | Sinha et al. |
| 8,893,168 B2 | 11/2014 | Sinha et al. |
| 8,898,714 B2 | 11/2014 | Neumeier et al. |
| 8,918,804 B2 | 12/2014 | Sinha et al. |
| 8,918,832 B2 | 12/2014 | Sinha et al. |
| 8,930,980 B2 | 1/2015 | Neumeier et al. |
| 8,959,202 B2 | 2/2015 | Haitsma et al. |
| 9,055,309 B2 | 6/2015 | Neumeier et al. |
| 9,055,335 B2 | 6/2015 | Neumeier et al. |
| 9,071,868 B2 | 6/2015 | Neumeier et al. |
| 9,094,714 B2 | 7/2015 | Neumeier et al. |

(56) References Cited

U.S. PATENT DOCUMENTS

| | | |
|---|---|---|
| 9,094,715 B2 | 7/2015 | Neumeier et al. |
| 9,262,671 B2 | 2/2016 | Unzueta |
| 9,368,021 B2 | 6/2016 | Touloumtzis |
| 9,449,090 B2 | 9/2016 | Neumeier et al. |
| 9,465,867 B2 | 10/2016 | Hoarty |
| 9,838,753 B2 | 12/2017 | Neumeier et al. |
| 9,955,192 B2 | 4/2018 | Neumeier et al. |
| 10,080,062 B2 | 9/2018 | Neumeier et al. |
| 10,116,972 B2 | 10/2018 | Neumeier et al. |
| 10,169,455 B2 | 1/2019 | Neumeier et al. |
| 10,185,768 B2 | 1/2019 | Neumeier et al. |
| 10,192,138 B2 | 1/2019 | Neumeier et al. |
| 10,271,098 B2 | 4/2019 | Neumeier et al. |
| 10,284,884 B2 | 5/2019 | Neumeier et al. |
| 10,306,274 B2 | 5/2019 | Neumeier et al. |
| 2001/0039658 A1 | 11/2001 | Walton |
| 2001/0044992 A1 | 11/2001 | Jahrling |
| 2002/0026635 A1 | 2/2002 | Wheeler et al. |
| 2002/0054069 A1 | 5/2002 | Britt, Jr. et al. |
| 2002/0054695 A1 | 5/2002 | Bjorn et al. |
| 2002/0056088 A1 | 5/2002 | Silva, Jr. et al. |
| 2002/0059633 A1 | 5/2002 | Harkness et al. |
| 2002/0078144 A1 | 6/2002 | Lamkin et al. |
| 2002/0083060 A1 | 6/2002 | Wang et al. |
| 2002/0100041 A1 | 7/2002 | Rosenberg et al. |
| 2002/0105907 A1 | 8/2002 | Bruekers et al. |
| 2002/0120925 A1 | 8/2002 | Logan |
| 2002/0122042 A1 | 9/2002 | Bates |
| 2002/0162117 A1 | 10/2002 | Pearson et al. |
| 2002/0162118 A1 | 10/2002 | Levy et al. |
| 2003/0026422 A1 | 2/2003 | Gerheim et al. |
| 2003/0086341 A1 | 5/2003 | Wells |
| 2003/0105794 A1 | 6/2003 | Jasinschi |
| 2003/0121037 A1 | 6/2003 | Swix et al. |
| 2003/0121046 A1 | 6/2003 | Roy et al. |
| 2003/0147561 A1 | 8/2003 | Faibish et al. |
| 2003/0188321 A1 | 10/2003 | Shoff et al. |
| 2003/0208763 A1 | 11/2003 | McElhatten et al. |
| 2004/0045020 A1 | 3/2004 | Witt et al. |
| 2004/0059708 A1 | 3/2004 | Dean et al. |
| 2004/0183825 A1 | 9/2004 | Stauder et al. |
| 2004/0216171 A1 | 10/2004 | Barone, Jr. et al. |
| 2004/0221237 A1 | 11/2004 | Foote et al. |
| 2004/0226035 A1 | 11/2004 | Hauser |
| 2004/0240562 A1 | 12/2004 | Bargeron et al. |
| 2005/0015795 A1 | 1/2005 | Iggulden |
| 2005/0015796 A1 | 1/2005 | Bruckner et al. |
| 2005/0027766 A1 | 2/2005 | Ben |
| 2005/0066352 A1 | 3/2005 | Herley |
| 2005/0120372 A1 | 6/2005 | Itakura |
| 2005/0172312 A1 | 8/2005 | Lienhart et al. |
| 2005/0207416 A1 | 9/2005 | Rajkotia |
| 2005/0209065 A1 | 9/2005 | Schlosser et al. |
| 2005/0235318 A1 | 10/2005 | Grauch et al. |
| 2006/0029286 A1 | 2/2006 | Lim et al. |
| 2006/0029368 A1 | 2/2006 | Harville |
| 2006/0031914 A1 | 2/2006 | Dakss et al. |
| 2006/0133647 A1 | 6/2006 | Werner et al. |
| 2006/0153296 A1 | 7/2006 | Deng |
| 2006/0155952 A1 | 7/2006 | Haas |
| 2006/0173831 A1 | 8/2006 | Basso et al. |
| 2006/0187358 A1 | 8/2006 | Lienhart et al. |
| 2006/0193506 A1 | 8/2006 | Dorphan et al. |
| 2006/0195857 A1 | 8/2006 | Wheeler et al. |
| 2006/0195860 A1 | 8/2006 | Eldering et al. |
| 2006/0245724 A1 | 11/2006 | Hwang et al. |
| 2006/0245725 A1 | 11/2006 | Lim |
| 2006/0253330 A1 | 11/2006 | Maggio et al. |
| 2006/0277047 A1 | 12/2006 | DeBusk et al. |
| 2006/0294561 A1 | 12/2006 | Grannan et al. |
| 2007/0009235 A1 | 1/2007 | Walters et al. |
| 2007/0033608 A1 | 2/2007 | Eigeldinger |
| 2007/0050832 A1 | 3/2007 | Wright et al. |
| 2007/0061724 A1 | 3/2007 | Slothouber et al. |
| 2007/0061831 A1 | 3/2007 | Savoor et al. |
| 2007/0083901 A1 | 4/2007 | Bond |
| 2007/0094696 A1 | 4/2007 | Sakai |
| 2007/0109449 A1 | 5/2007 | Cheung |
| 2007/0113263 A1 | 5/2007 | Chatani |
| 2007/0139563 A1 | 6/2007 | Zhong |
| 2007/0143796 A1 | 6/2007 | Malik |
| 2007/0168409 A1 | 7/2007 | Cheung |
| 2007/0180459 A1 | 8/2007 | Smithpeters et al. |
| 2007/0192782 A1 | 8/2007 | Ramaswamy |
| 2007/0242880 A1 | 10/2007 | Stebbings |
| 2007/0250901 A1 | 10/2007 | McIntire et al. |
| 2007/0261070 A1 | 11/2007 | Brown et al. |
| 2007/0261075 A1 | 11/2007 | Glasberg |
| 2007/0271300 A1 | 11/2007 | Ramaswamy |
| 2007/0274537 A1 | 11/2007 | Srinivasan |
| 2007/0300280 A1 | 12/2007 | Turner et al. |
| 2008/0044102 A1 | 2/2008 | Ekin |
| 2008/0046945 A1 | 2/2008 | Hanley |
| 2008/0089551 A1 | 4/2008 | Heather et al. |
| 2008/0138030 A1 | 6/2008 | Bryan et al. |
| 2008/0155588 A1 | 6/2008 | Roberts et al. |
| 2008/0155627 A1 | 6/2008 | O'Connor et al. |
| 2008/0172690 A1 | 7/2008 | Kanojia et al. |
| 2008/0208891 A1 | 8/2008 | Wang et al. |
| 2008/0240562 A1 | 10/2008 | Fukuda et al. |
| 2008/0263620 A1 | 10/2008 | Berkvens et al. |
| 2008/0276266 A1 | 11/2008 | Huchital et al. |
| 2008/0310731 A1 | 12/2008 | Stojancic et al. |
| 2008/0313140 A1 | 12/2008 | Pereira et al. |
| 2009/0007195 A1 | 1/2009 | Beyabani |
| 2009/0024923 A1 | 1/2009 | Hartwig et al. |
| 2009/0028517 A1 | 1/2009 | Shen et al. |
| 2009/0052784 A1 | 2/2009 | Covell et al. |
| 2009/0087027 A1 | 4/2009 | Eaton et al. |
| 2009/0088878 A1 | 4/2009 | Otsuka et al. |
| 2009/0100361 A1 | 4/2009 | Abello et al. |
| 2009/0131861 A1 | 5/2009 | Braig et al. |
| 2009/0172728 A1 | 7/2009 | Shkedi et al. |
| 2009/0172746 A1 | 7/2009 | Aldrey et al. |
| 2009/0175538 A1 | 7/2009 | Bronstein et al. |
| 2009/0213270 A1 | 8/2009 | Ismert et al. |
| 2009/0235312 A1 | 9/2009 | Morad et al. |
| 2010/0010648 A1 | 1/2010 | Bull et al. |
| 2010/0083299 A1 | 4/2010 | Nelson |
| 2010/0115543 A1 | 5/2010 | Falcon |
| 2010/0115574 A1 | 5/2010 | Hardt et al. |
| 2010/0125870 A1 | 5/2010 | Ukawa et al. |
| 2010/0166257 A1 | 7/2010 | Wredenhagen |
| 2010/0199295 A1 | 8/2010 | Katpelly et al. |
| 2010/0235486 A1 | 9/2010 | White et al. |
| 2010/0253838 A1 | 10/2010 | Garg et al. |
| 2010/0269138 A1 | 10/2010 | Krikorian et al. |
| 2010/0306805 A1 | 12/2010 | Neumeier et al. |
| 2010/0306808 A1 | 12/2010 | Neumeier et al. |
| 2011/0015996 A1 | 1/2011 | Kassoway et al. |
| 2011/0026761 A1 | 2/2011 | Radhakrishnan et al. |
| 2011/0041154 A1 | 2/2011 | Olson |
| 2011/0055552 A1 | 3/2011 | Francis et al. |
| 2011/0096955 A1 | 4/2011 | Voloshynovskiy et al. |
| 2011/0247042 A1 | 10/2011 | Mallinson |
| 2011/0251987 A1 | 10/2011 | Buchheit |
| 2011/0289099 A1 | 11/2011 | Quan |
| 2011/0299770 A1 | 12/2011 | Vaddadi et al. |
| 2012/0017240 A1 | 1/2012 | Shkedi |
| 2012/0054143 A1 | 3/2012 | Doig et al. |
| 2012/0076357 A1 | 3/2012 | Yamamoto et al. |
| 2012/0095958 A1 | 4/2012 | Pereira et al. |
| 2012/0117584 A1 | 5/2012 | Gordon |
| 2012/0158511 A1 | 6/2012 | Lucero et al. |
| 2012/0174155 A1 | 7/2012 | Mowrey et al. |
| 2012/0177249 A1 | 7/2012 | Levy et al. |
| 2012/0185566 A1 | 7/2012 | Nagasaka et al. |
| 2012/0272259 A1 | 10/2012 | Cortes et al. |
| 2012/0294586 A1 | 11/2012 | Weaver et al. |
| 2012/0317240 A1 | 12/2012 | Wang |
| 2012/0324494 A1 | 12/2012 | Burger et al. |
| 2013/0007191 A1 | 1/2013 | Klappert et al. |
| 2013/0042262 A1 | 2/2013 | Riethmueller |
| 2013/0050564 A1 | 2/2013 | Adams, Jr. et al. |

(56) References Cited

U.S. PATENT DOCUMENTS

| | | |
|---|---|---|
| 2013/0054356 A1 | 2/2013 | Richman et al. |
| 2013/0067523 A1 | 3/2013 | Etsuko et al. |
| 2013/0070847 A1 | 3/2013 | Iwamoto et al. |
| 2013/0108173 A1 | 5/2013 | Lienhart et al. |
| 2013/0139209 A1 | 5/2013 | Urrabazo et al. |
| 2013/0198768 A1 | 8/2013 | Kitazato |
| 2013/0202150 A1 | 8/2013 | Sinha et al. |
| 2013/0209065 A1 | 8/2013 | Yeung |
| 2013/0212609 A1 | 8/2013 | Sinha et al. |
| 2013/0290502 A1 | 10/2013 | Bilobrov |
| 2013/0297727 A1 | 11/2013 | Levy |
| 2013/0318096 A1 | 11/2013 | Cheung |
| 2014/0016696 A1 | 1/2014 | Nelson |
| 2014/0052737 A1 | 2/2014 | Ramanathan et al. |
| 2014/0082663 A1 | 3/2014 | Neumeier et al. |
| 2014/0088742 A1 | 3/2014 | Srinivasan |
| 2014/0123165 A1 | 5/2014 | Mukherjee et al. |
| 2014/0130092 A1 | 5/2014 | Kunisetty |
| 2014/0188487 A1 | 7/2014 | Perez Gonzalez |
| 2014/0193027 A1 | 7/2014 | Scherf |
| 2014/0195548 A1 | 7/2014 | Harron |
| 2014/0201769 A1 | 7/2014 | Neumeier et al. |
| 2014/0201772 A1 | 7/2014 | Neumeier et al. |
| 2014/0201787 A1 | 7/2014 | Neumeier et al. |
| 2014/0219554 A1 | 8/2014 | Kawahara et al. |
| 2014/0237576 A1 | 8/2014 | Zhang |
| 2014/0258375 A1 | 9/2014 | Munoz |
| 2014/0270489 A1 | 9/2014 | Lim et al. |
| 2014/0270504 A1 | 9/2014 | Baum et al. |
| 2014/0270505 A1 | 9/2014 | McCarthy |
| 2014/0282671 A1 | 9/2014 | McMillan |
| 2014/0293794 A1 | 10/2014 | Zhong et al. |
| 2014/0344880 A1 | 11/2014 | Geller et al. |
| 2015/0026728 A1 | 1/2015 | Carter et al. |
| 2015/0040074 A1 | 2/2015 | Hofmann et al. |
| 2015/0100979 A1 | 4/2015 | Moskowitz et al. |
| 2015/0112988 A1 | 4/2015 | Pereira et al. |
| 2015/0120839 A1 | 4/2015 | Kannan et al. |
| 2015/0121409 A1 | 4/2015 | Zhang et al. |
| 2015/0128161 A1 | 5/2015 | Conrad et al. |
| 2015/0163545 A1 | 6/2015 | Freed et al. |
| 2015/0181311 A1 | 6/2015 | Navin et al. |
| 2015/0229998 A1 | 8/2015 | Kaushal et al. |
| 2015/0256891 A1 | 9/2015 | Kim et al. |
| 2015/0302890 A1 | 10/2015 | Ergen et al. |
| 2015/0382075 A1 | 12/2015 | Neumeier et al. |
| 2016/0227261 A1 | 8/2016 | Neumeier et al. |
| 2016/0227291 A1 | 8/2016 | Shaw et al. |
| 2016/0286244 A1 | 9/2016 | Chang et al. |
| 2016/0307043 A1 | 10/2016 | Neumeier |
| 2016/0314794 A1 | 10/2016 | Leitman et al. |
| 2016/0353172 A1 | 12/2016 | Miller et al. |
| 2016/0359791 A1 | 12/2016 | Zhang et al. |
| 2017/0017645 A1 | 1/2017 | Neumeier et al. |
| 2017/0017651 A1 | 1/2017 | Neumeier et al. |
| 2017/0017652 A1 | 1/2017 | Neumeier et al. |
| 2017/0019716 A1 | 1/2017 | Neumeier et al. |
| 2017/0019719 A1 | 1/2017 | Neumeier et al. |
| 2017/0026671 A1 | 1/2017 | Neumeier et al. |
| 2017/0031573 A1 | 2/2017 | Kaneko |
| 2017/0032033 A1 | 2/2017 | Neumeier et al. |
| 2017/0032034 A1 | 2/2017 | Neumeier et al. |
| 2017/0134770 A9 | 5/2017 | Neumeier et al. |
| 2017/0186042 A1 | 6/2017 | Wong et al. |
| 2017/0311014 A1 | 10/2017 | Fleischman |
| 2017/0353776 A1 | 12/2017 | Holden et al. |
| 2018/0227646 A9* | 8/2018 | Navin .................. H04N 21/812 |

FOREIGN PATENT DOCUMENTS

| | | |
|---|---|---|
| CN | 101162470 | 4/2008 |
| CN | 1681304 | 7/2010 |
| CN | 102377960 | 3/2012 |
| CN | 101681373 | 9/2012 |
| EP | 248 533 | 8/1994 |
| EP | 1578126 | 9/2005 |
| EP | 1 760 693 A1 | 3/2007 |
| EP | 2 084 624 | 8/2009 |
| EP | 2 352 289 | 8/2011 |
| EP | 2 541 963 A2 | 1/2013 |
| EP | 2 685 450 A1 | 1/2014 |
| GB | 2457694 | 8/2009 |
| WO | 0144992 | 6/2001 |
| WO | 2005/101998 | 11/2005 |
| WO | 2007/114796 | 10/2007 |
| WO | 2008/065340 | 6/2008 |
| WO | 1504445 B1 | 8/2008 |
| WO | 2009/131861 | 10/2009 |
| WO | 2009/150425 | 12/2009 |
| WO | 2010/135082 | 11/2010 |
| WO | 2011/090540 A2 | 7/2011 |
| WO | 2012/057724 | 5/2012 |
| WO | 2012/108975 | 8/2012 |
| WO | 2012/170451 | 12/2012 |
| WO | 2014/142758 | 9/2014 |
| WO | 2014/145929 A1 | 9/2014 |
| WO | 2015/100372 A1 | 7/2015 |
| WO | 2016/123495 | 8/2016 |
| WO | 2016/168556 | 10/2016 |
| WO | 2017/011758 | 1/2017 |
| WO | 2017/011792 | 1/2017 |

OTHER PUBLICATIONS

International Search Report and Written Opinion dated Apr. 26, 2016 for PCT Application No. PCT/US2016/015681, 13 pages.

"How to: Watch from the beginning |About DISH" (Dec. 31, 2014) XP055265764, retrieved on Apr. 15, 2016 from URL:http://about.dish.com/blog/hopper/how-watch-beginning 2 pages.

International Search Report and Written Opinion dated Jun. 24, 2016 for PCT Application No. PCT/US2016/027691, 13 pages.

Gionis et al., "Similarity Search in High Dimension via Hashing", Proceedings of the 25th VLDB Conference, 1999, 12 pages.

Huang, "Bounded Coordinate System Indexing for Real-time Video Clip Search", Retrieved from the Internet:URL:http://staff.itee.uq.edu.aujzxf/papers/TOIS.pdf, Jan. 1, 2009, 32 pages.

Kim et al., "Edge-Based Spatial Descriptor Using Color Vector Angle for Effective Image Retrieval", Modeling Decisions for Artificial Intelligence; [Lecture Notes in Computer Science; Lecture Notes in Artificial Intelligence, Jul. 1, 2005, pp. 365-375.

Liu et al., "Near-duplicate video retrieval", ACM Computing Surveys, vol. 45, No. 4, Aug. 30, 2013, pp. 1-23.

International Search Report and Written Opinion dated Oct. 12, 2016 for PCT Application No. PCT/US2016/042522,13 pages.

International Search Report and Written Opinion dated Oct. 11, 2016 for PCT Application No. PCT/US2016/042621, 13 pages.

International Search Report and Written Opinion dated Oct. 20, 2016 for PCT Application No. PCT/US2016/042611,12 pages.

Scouarnec et al., "Cache policies for cloud-based systems:To keep or not to keep", 2014 IEEE 7th International Conference on Cloud Computing, IEEE XP032696624, Jun. 27, 2014, pp. 1-8.

International Search Report and Written Opinion dated Oct. 25, 2016 for PCT Application No. PCT/US2016/042564, 14 pages.

Anonymous; "Cache (computing)" Wikipedia, the free encyclopedia, URL:http://en.wikipedia.org/w/index.phpti tle=Cache(computing)&oldid=474222804, Jan. 31, 2012; 6 pages.

International Search Report and Written Opinion dated Oct. 24, 2016 for PCT Application No. PCT/US2016/042557, 11 pages.

Anil K. Jain, "Image Coding Via a Nearest Neighbors Image Model" IEEE Transactions on Communications, vol. Com-23, No. 3, Mar. 1975, pp. 318-331.

Lee et al., "Fast Video Search Algorithm for Large Video Database Using Adjacent Pixel Intensity Difference Quantization Histogram Feature" International Journal of Computer Science and Network Security, vol. 9, No. 9, Sep. 2009, pp. 214-220.

Li et al., A Confidence Based Recognition System for TV Commercial Extraction, Conferences in Research and Practice in Information Technology vol. 75, 2008.

(56) References Cited

OTHER PUBLICATIONS

International Search Report and Written Opinion dated Jul. 27, 2011 for PCT Application No. PCT/US2010/057153, 8 pages.
International Search Report and Written Opinion dated Aug. 31, 2011 for PCT Application No. PCT/US2010/057155, 8 pages.
International Search Report and Written Opinion dated Aug. 26, 2014 for PCT Application No. PCT/US2014/030782; 11 pages.
International Search Report and Written Opinion dated Jul. 21, 2014 for PCT Application No. PCT/US2014/030795; 10 pages.
International Search Report and Written Opinion, dated Jul. 25, 2014 for PCT Application No. PCT/US2014/030805, 10 pages.
Extended European Search Report dated Mar. 7, 2013 for European Application No. 12178359.1, 8 pages.
Extended European Search Report dated Oct. 11, 2013 for European Application No. 10844152.8, 19 pages.
Kabal (P.), Ramachandran (R.P.): The computation of line spectral frequencies using Chebyshev polynomials, IEEE Trans. on ASSP, vol. 34, No. 6, pp. 1419-1426, 1986.
Itakura (F.): Line spectral representation of linear predictive coefficients of speech signals, J. Acoust. Soc. Amer., vol. 57, Supplement No. 1, S35, 1975, 3 pages.
Bistritz (Y.), Pellerm (S.): Immittance Spectral Pairs (ISP) for speech encoding, Proc. ICASSP'93, pp. 11-9 to 11-12.
International Search Report and Written Opinion dated Mar. 8, 2016 for PCT Application No. PCT/ US2015/062945; 9 pages.
Extended European Search Report dated Dec. 21, 2016 for European Application No. 14763506.4, 11 pages.
Extended European Search Report dated Nov. 23, 2016 for European Application No. 14764182.3, 10 pages.
Extended European Search Report dated Jan. 24, 2017 for European Application No. 14762850.7, 12 pages.
Extended European Search Report dated Jun. 16, 2017, for European Patent Application No. 14873564.0, 8 pages.
U.S. Appl. No. 14/551,933, "Final Office Action", dated May 23, 2016, 19 pages.
U.S. Appl. No. 14/551,933 , "Non-Final Office Action", dated Oct. 17, 2016, 15 pages.
U.S. Appl. No. 14/551,933 , "Non-Final Office Action", dated Dec. 31, 2015, 24 pages.
U.S. Appl. No. 14/551,933 , "Notice of Allowance", dated Mar. 21, 2017, 8 pages.
U.S. Appl. No. 14/217,039 , "Non-Final Office Action", dated May 23, 2014, 27 pages.
U.S. Appl. No. 14/217,039 , "Final Office Action", dated Nov. 7, 2014, 15 pages.
U.S. Appl. No. 14/217,039 , "Notice of Allowance", dated Jan. 29, 2015, 8 pages.
U.S. Appl. No. 14/678,856, "Non-Final Office Action", dated Dec. 1, 2015, 28 pages.
U.S. Appl. No. 14/678,856, "Notice of Allowance", dated May 20, 2016, 9 pages.
U.S. Appl. No. 14/217,075, "Non-Final Office Action", dated Jul. 16, 2014, 39 pages.
U.S. Appl. No. 14/217,075, "Notice of Allowance ", dated Feb. 20, 2015, 51 pages.
U.S. Appl. No. 14/217,094, "Notice of Allowance ", dated Sep. 4, 2014, 30 pages.
U.S. Appl. No. 14/217,375, "Non-Final Office Action", dated Apr. 1, 2015, 39 pages.
U.S. Appl. No. 14/217,375, "Notice of Allowance", dated Apr. 1, 2015, 31 pages.
U.S. Appl. No. 14/217,425, "Non-Final Office Action", dated Apr. 7, 2015, 12 pages.
U.S. Appl. No. 14/217,425, "Notice of Allowance", dated May 20, 2015, 15 pages.
U.S. Appl. No. 14/217,435, "Non-Final Office Action", dated Nov. 24, 2014, 9 pages.
U.S. Appl. No. 14/217,435, "Notice of Allowance", dated Jun. 5, 2015, 9 pages.
U.S. Appl. No. 15/011,099 , "First Action Interview Office Action Summary", dated May 9, 2017, 6 pages.
U.S. Appl. No. 15/011,099 , "First Action Interview Pilot Program Pre-Interview Communication", dated Feb. 28, 2017, 5 pages.
U.S. Appl. No. 12/788,721 , "Non-Final Office Action", dated Mar. 28, 2012, 15 pages.
U.S. Appl. No. 12/788,721 , "Final Office Action", dated Aug. 15, 2012, 22 pages.
U.S. Appl. No. 12/788,721 , "Notice of Allowance", dated Aug. 15, 2013, 16 pages.
U.S. Appl. No. 14/763,158 , "Non-Final Office Action", dated Jun. 27, 2016, 16 pages.
U.S. Appl. No. 14/763,158 , "Final Office Action", dated Sep. 7, 2016, 12 pages.
U.S. Appl. No. 14/763,158 , "Notice of Allowance", dated Mar. 17, 2016, 8 pages.
U.S. Appl. No. 14/807,849 , "Non-Final Office Action", dated Nov. 25, 2015, 12 pages.
U.S. Appl. No. 14/807,849 , "Final Office Action", dated Apr. 19, 2016, 13 pages.
U.S. Appl. No. 14/807,849 , "Non-Final Office Action", dated Feb. 28, 2017, 10 pages.
U.S. Appl. No. 14/089,003 , "Notice of Allowance", dated Jul. 30, 2014, 24 pages.
U.S. Appl. No. 12/788,748 , "Non-Final Office Action", dated Jan. 10, 2013, 10 pages.
U.S. Appl. No. 12/788,748 , "Final Office Action", dated Nov. 21, 2013, 13 pages.
U.S. Appl. No. 12/788,748 , "Notice of Allowance", dated Mar. 6, 2014, 7 pages.
U.S. Appl. No. 14/953,994 , "Non-Final Office Action", dated Mar. 3, 2016, 34 pages.
U.S. Appl. No. 14/953,994 , "Final Office Action", dated Jun. 1, 2016, 36 pages.
U.S. Appl. No. 14/953,994 , "Notice of Allowance", dated Aug. 31, 2016, 15 pages.
U.S. Appl. No. 14/807,849 , "Final Office Action", dated Jun. 22, 2017, 10 pages.
U.S. Appl. No. 15/011,099 , "Final Office Action", dated Jul. 24, 2017, 22 pages.
U.S. Appl. No. 15/240,801 , "Non-Final Office Action", dated Aug. 11, 2017, 18 pages.
U.S. Appl. No. 15/240,815 , "Non-Final Office Action", dated Aug. 23, 2017, 15 pages.
U.S. Appl. No. 15/211,345 , "First Action Interview Pilot Program Pre-Interview Communication", dated Sep. 19, 2017, 8 pages.
U.S. Appl. No. 14/807,849 , "Notice of Allowance", dated Nov. 30, 2017, 9 pages.
U.S. Appl. No. 15/240,801 , "Final Office Action", dated Dec. 22, 2017, 24 pages.
U.S. Appl. No. 15/011,099, "Non-Final Office Action", dated Jan. 22, 2018, 23 pages.
U.S. Appl. No. 15/240,815 , "Final Office Action", dated Mar. 2, 2018, 14 pages.
U.S. Appl. No. 15/211,345 , "Final Office Action", dated Mar. 2, 2018, 14 pages.
Extended European Search Report dated Mar. 22, 2018 for European Application No. 15865033.3, 10 pages.
U.S. Appl. No. 15/099,842 , "Final Office Action", dated Apr. 2, 2018, 8 pages.
U.S. Appl. No. 15/210,730, "Notice of Allowance", dated May 23, 2018, 10 pages.
U.S. Appl. No. 15/796,706, "Non-Final Office Action", dated Jun. 26, 2018, 17 pages.
U.S. Appl. No. 15/011,099, "Notice of Allowance", dated Jun. 28, 2018, 12 pages.
U.S. Appl. No. 15/796,698, "Non-Final Office Action", dated Jul. 5, 2018, 15 pages.
U.S. Appl. No. 15/240,801, "Notice of Allowance", dated Aug. 30, 2018, 9 pages.
U.S. Appl. No. 15/211,345, "Non-Final Office Action", dated Sep. 4, 2018, 13 pages.

(56) References Cited

OTHER PUBLICATIONS

U.S. Appl. No. 15/099,842, "Notice of Allowance", dated Sep. 7, 2018, 10 pages.
U.S. Appl. No. 15/240,815, "Notice of Allowance", dated Sep. 12, 2018, 9 pages.
U.S. Appl. No. 15/290,848, "First Action Interview Office Action Summary", dated Nov. 2, 2018, 5 pages.
U.S. Appl. No. 15/796,692, "Notice of Allowance", dated Dec. 5, 2018, 8 pages.
U.S. Appl. No. 15/796,698, "Notice of Allowance", dated Dec. 20, 2018, 8 pages.
U.S. Appl. No. 15/796,706, "Notice of Allowance", dated Jan. 11, 2019, 9 pages.
U.S. Appl. No. 15/211,508, "Non-Final Office Action", dated Jan. 10, 2019, 20 pages.
U.S. Appl. No. 15/211,492, "Non-Final Office Action", dated Jan. 11, 2019, 19 pages.
U.S. Appl. No. 16/141,598, "First Action Interview Office Action Summary", dated Jan. 11, 2019, 8 pages.
U.S. Appl. No. 15/290,848, "Non-Final Office Action", dated Mar. 5, 2019, 5 pages.
U.S. Appl. No. 15/211,991, "Non-Final Office Action", dated Feb. 26, 2019, 8 pages.
U.S. Appl. No. 15/211,345, "Notice of Allowance", dated Mar. 20, 2019, 6 pages.
U.S. Appl. No. 16/210,796, "Non-Final Office Action", dated Mar. 22, 2019, 7 pages.
U.S. Appl. No. 16/141,598, "Notice of Allowance", dated Apr. 25, 2019, 11 pages.
U.S. Appl. No. 15/211,508, "Final Office Action", dated Jun. 20, 2019, 20 pages.
U.S. Appl. No. 15/211,492, "Final Office Action", dated Jun. 20, 2019, 18 pages.

\* cited by examiner

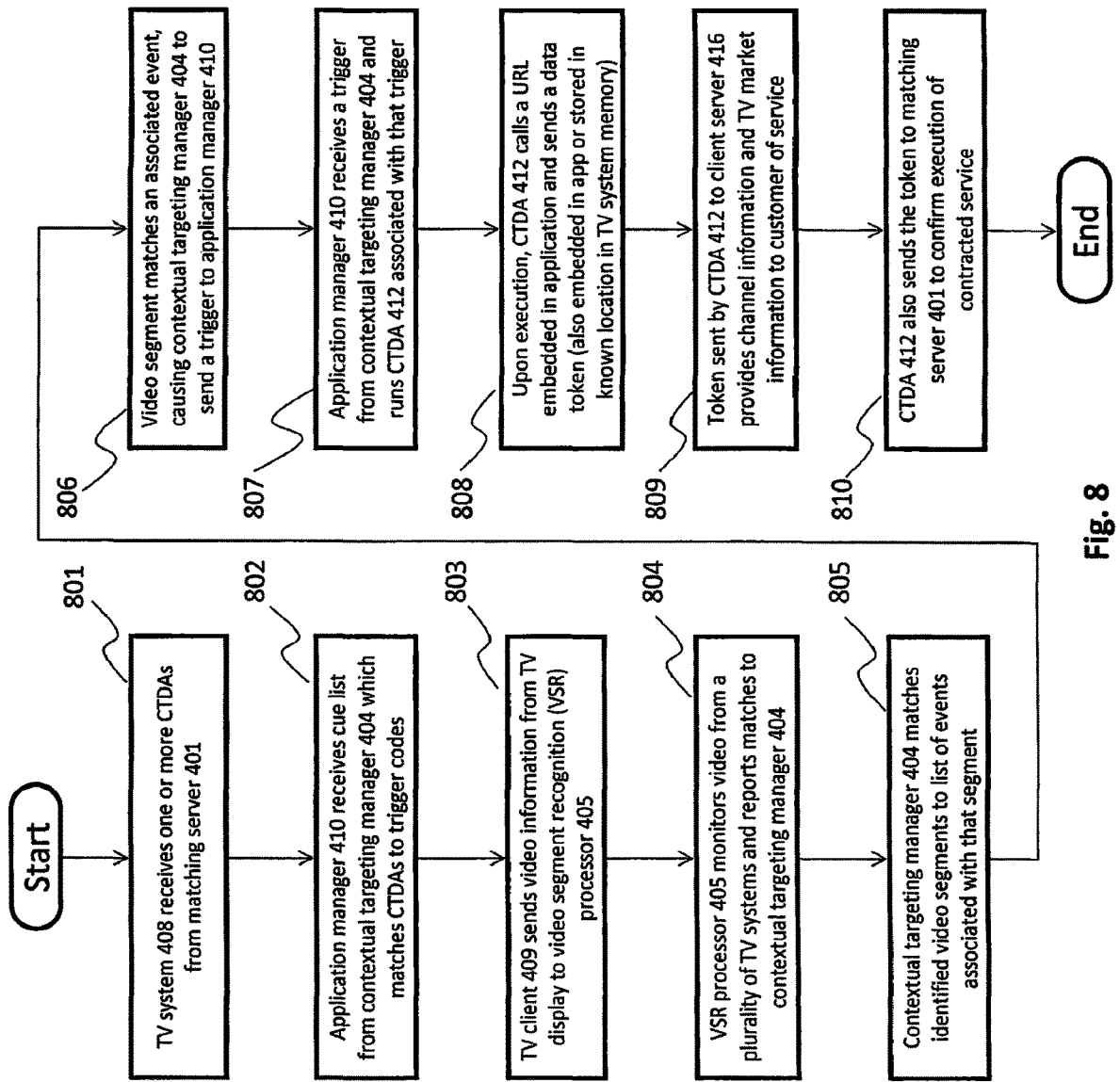

MONITORING INDIVIDUAL VIEWING OF TELEVISION EVENTS USING TRACKING PIXELS AND COOKIES

CROSS-REFERENCES TO RELATED APPLICATIONS

This application is a Continuation of U.S. patent application Ser. No. 15/796,706, filed Oct. 27, 2017, which is a Continuation of U.S. patent application Ser. No. 14/763,158, filed Jul. 23, 2015, which is a National Stage Entry of PCT/US14/72255, filed Dec. 23, 2014, which claims the benefit of U.S. Provisional Patent Application No. 61/920,086, filed Dec. 23, 2013. U.S. patent application Ser. No. 15/796,706 is also a Continuation-in-Part of U.S. patent application Ser. No. 14/551,933, filed Nov. 24, 2014. The entire contents of each of the patent applications identified above are hereby incorporated by reference in their entirety for all purposes.

BACKGROUND

The traditional television (TV) viewing experience and the process of accessing video media over the Internet have been converging for some time and are now becoming co-dependent. As a business model, both of these forms of media delivery have experimented over the years with monthly subscription fees and pay-per-view revenue models, but the advertising-supported model remains the dominant economic engine for both.

Financial support from advertisers is usually based on the number of viewers exposed to the advertisement with the advertiser being charged a fee for every thousand "impressions" or times that the advertisement is viewed; usually called "cost per thousand" or "CPM". Generally speaking, higher CPM rates are charged for advertising that can provide additional details about those individual impressions, such as the time of day it was viewed or the market area where the viewing occurred. Associating the impressions with demographic information regarding those seeing the advertisement is even more valuable, particularly when that demographic is one that advertisers believe to offer better prospects for positive actions regarding the product or service being promoted.

For content accessed by personal computers or any other type of Internet-connected device, a viewer's Internet browsing activities may be readily detected and captured via various techniques. The most common technique is the use of a "cookie", also known as an HTTP cookie, web cookie, or browser cookie. This is a small data file sent from the website being browsed to the user's browser. The browser then sends the cookie back to the server every time the website is re-loaded so that the server can be made aware of the user's previous activity on that server. This approach enables "shopping carts" to retain earlier, uncompleted purchases, and to pre-authenticate users so that they do not need to re-enter certain identification.

Cookies may also be used to build a history of previous browsing. Such information is beneficially used to enable the presentation of commercial offers that are more likely to be of interest to the user than arbitrary placements. For example, a user in Philadelphia who browses a search engine, such as Google, to look for say, "Hotels in Seattle," would find that many websites browsed later would be displaying ads for Seattle travel, tours, entertainment, local attractions, and other custom-served offers. This is a result of certain data about the search activity being stored locally on the user's computer in the form of a data cookie.

Another common technique leverages the fact that most commercial web pages are not wholly self-contained. For a variety of technical and commercial reasons, many elements seen on the displayed web page are instead assembled "on the fly" by using content downloaded from many different servers, often geographically dispersed. Hence the screen location where a certain picture, animation or advertisement would be displayed is often actually blank when initially downloaded, but contains program instructions, most commonly in the HTML or JavaScript languages, that makes a request or "call" to the server where the needed content resides.

These requests typically include the IP address of the requesting computer, the time the content was requested, the type of web browser that made the request, the nature of the display it has to appear on, and other specifics. In addition to acting on the request and serving the requested content, the server can store all of this information and associate it with a unique tracking token, sometimes in the form of a browser cookie, attached to the content request.

Even where the web page does not need additional content to complete the user's viewing experience, this same technique can be used to gain insight into the actions and habits of the person browsing the site, which can then be used to personalize the types of advertising served to the user. This can be accomplished by programming web pages to request a graphic element from a particular server using an invisible (non-displaying) graphic file known as a "tracking pixel." These are (usually) tiny image files (GIFs, JPEGs, PNGs, etc.) whose Internet address is put into web pages and other HTML documents. When the particular page containing such a tracking pixel is loaded, the web browser then sends a request, typically via the Internet, to a server at the address of the embedded web graphic. The addressed server sends the requested graphic file (e.g., a tracking pixel) and logs the event of the request for the specific graphic. These tracking pixel files are sometimes known by other names such as web bugs, transparent pixels, tracking bugs, pixel tags, web beacons or clear gifs. Regardless of what these token images are called, their function is largely the same.

In many commercial applications, an advertiser or its agency or other third-party service might decide to track impressions (as discussed above, an impression constitutes one person viewing one message) with a tracking pixel. Each time the advertisement is displayed, code in the displaying web page addresses some server, locally or across the Internet, containing the tracking pixel. The server answering the request then records information that can include the user's IP Address, Hostname, Device type, Screen Size, Operating System, Web browser, and the Date that the image was viewed.

In traditional TV viewing, commercial ratings data is typically collected and analyzed in an offline fashion by media research companies such as the Nielsen Company, using specialized equipment sometimes called a "Home Unit" that the research company has arranged to get connected to TV sets in a limited number of selected households. These devices record when the TV was tuned to a particular channel, however, there is currently an unmet need for reliable techniques to measure whether a specific video segment, (either broadcast content or advertisement) was actually watched by the viewer. Meanwhile, there is still no truly reliable process for confirming if and when broadcast content that has been recorded and stored on a DVR or the like is viewed at some later time.

Further, with existing monitoring services, such as Nielsen, there is a material delay between the time a program is broadcast and the availability of reliable, broadly-sampled information about what programming was watched in which markets and by what demographics is made available to either the content providers or advertisers. It is also a matter of significant controversy how valid the projections to the whole U.S. could be when they have been extrapolated from such a small sample of potential viewers (estimated to be approximately one out of every ten thousand households).

Consequently, the ability to accurately determine in near real-time exactly what TV program or advertisement each and every TV viewer in the U.S. is watching at any moment has long been an unmet market need. One reason this has been such a challenge is because it would require being able to identify not just what channel has been tuned to, but specifically what content is being watched, since the media actually being consumed by the viewer can include not just the scheduled programming but also regionally or locally-inserted advertisements, content that has been time-shifted, or other entertainment products.

Some attempts have been made to use audio matching technology to map what is being heard on the home TV set to a database of "audio fingerprints." This is a process that purports to match the fingerprints to certain specific content. The speed and reliability of such technology that has been made commercially available to date has been found to have limitations. Video matching of screen images to known content is computationally more challenging than using audio but theoretically more accurate and useful. Matching the video segment being viewed to a database of samples (including those extracted only seconds previously from a live TV event) has offered a substantial technical challenge but has been effectively employed and is taught in U.S. Pat. No. 8,595,781, among others.

SUMMARY

The subject matter disclosed in detail below is directed to a real-time content identification and tracking system enabling monitoring of television programming consumption specific to an individual television or other viewing device. Metrics collected may include data regarding viewing of specific broadcast media, commercial messages, interactive on-screen information or other programming, as well as locally cached, time-shifted programming. Information about media consumption by such specific television sets or other viewing means may be returned to a commercial client of the system through a trusted third-party intermediary service and, in certain embodiments, encoded tokens may be used to manage the display of certain events as well as to enable robust auditing of each involved party's contractual performance.

More specifically, the systems and methods disclosed herein enable the identification of a video segment being watched or the identification of an interactive message being displayed on a video screen of any connected TV viewing device, such as a smart TV, a TV with a cable set-top box, or a TV with an Internet-based set-top box. Furthermore, this video segment identification system accurately identifies the segments whether broadcast, previously recorded, or a commercial message, while incorporating that ability into an integrated system enabling the provision of a number of new products and services to commercial clients in many ways similar to the usage tracking functionality provided by so-called cookies and tracking pixels for media consumption over the Internet. Various embodiments of systems and methods are described in detail below from the perspective of commercial practicality.

The ability to monitor the viewing of events on Internet-connected televisions at a multiplicity of locations can be used in conjunction with the display of contextually targeted content. The contextually targeted content is usually embedded within a contextually targeted display application module (hereinafter "contextually targeted display application"). One or more contextually targeted display applications are then sent ahead of time from the central server means to (and loaded in) each participating TV system prior to the display of a video segment of interest associated with those application modules. Sometimes when a contextually targeted display application is executed, the contextually targeted display application calls out to other servers across the Internet to get additional (or current) information to update, or add to, the content already embedded within the application module. All content of a contextually targeted display application, whether sent in advance or retrieved on execution, appears within the framework of a contextually targeted display application window which pops up on the TV screen for the user to view and sometimes interact with. It should be appreciated, however, that sometimes the contextually targeted display application's role is not to display anything but rather to simply call an embedded URL address (or send an embedded encoded token) to trigger an auditing means to register (i.e., log) a viewing event.

One aspect of the subject matter disclosed in detail below is a method, performed by a computer system, for automatically logging a viewing event on a screen of a television system, comprising the following operations: (a) storing a respective reference data set for each of a multiplicity of reference video segments in a database; (b) loading a multiplicity of contextually targeted display applications in a memory of the television system, each contextually targeted display application having a respective tracking pixel URL address embedded therein; (c) receiving video fingerprints from the television system at a server, the video fingerprints being derived from television signals for respective portions of a video segment being displayed on the screen; (d) searching the database to identify a reference data set that most matches the video fingerprint; (e) in response to identification of the matching reference data set in operation (d), identifying a contextually targeted display application which is associated with the matching reference data set; (f) in response to identification of the associated contextually targeted display application in operation (e), sending a signal identifying the associated contextually targeted display application to the television system; (g) sending a request for a tracking pixel from the television system to a server using the tracking pixel URL address embedded in the associated contextually targeted display application; (h) sending a tracking pixel from the server to the television system in response to receipt of the request for a tracking pixel; and (i) logging receipt of the request for a tracking pixel in a memory of the server. The request for the tracking pixel may include information identifying the TV system, information indicative of the geographical location of the TV system, information identifying the contextually targeted content, and the time when the request for the tracking pixel was received by the server.

Another aspect of the subject matter disclosed below is a system for automatically logging a viewing event on a screen of a television system the system comprising a television system having a screen, first and second servers, and a database which communicate via a network. The database stores a respective reference data set for each of a multiplicity of reference video segments. The television system is programmed to derive video fingerprints from television signals for a respective portion of a video segment being displayed on the screen. The first server is programmed to: load a multiplicity of contextually targeted display applications in a memory of the television system, each contextually targeted display application having a respective tracking pixel URL address embedded therein; receive the video fingerprints from the television system; search the database to identify a reference data set that most matches the video fingerprint; identify a contextually targeted display application which is associated with the matching reference data set; and send a signal identifying the associated contextually targeted display application to the television system. The TV system is further programmed to send a request for a tracking pixel to the tracking pixel URL address embedded in the associated contextually targeted display application, which tracking pixel URL address is located at the second server. The second server is programmed to receive the request for a tracking pixel from the television system, send the tracking pixel to the television system, and log receipt of the request for a tracking pixel in memory.

A further aspect is a method, performed by a computer system, for automatically logging a viewing event on a screen of a television system, comprising the following operations: (a) storing a respective reference data set for each of a multiplicity of reference video segments in a database; (b) loading a multiplicity of contextually targeted display applications in a memory of the television system, each contextually targeted display application having a respective encoded token embedded therein; (c) receiving video fingerprints from the television system at a server, the video fingerprints being derived from television signals for respective portions of a video segment being displayed on the screen; (d) searching the database to identify a reference data set that most matches the video fingerprint; (e) in response to identification of the matching reference data set in operation (d), identifying a contextually targeted display application which is associated with the matching reference data set; (f) in response to identification of the associated contextually targeted display application in operation (e), sending a signal identifying the associated contextually targeted display application to the television system; (g) sending an encoded token embedded in the associated contextually targeted display application from the television system to an auditing server; (h) decoding the encoded token at the auditing server; and (i) logging receipt of the encoded token in a memory of the auditing server.

Yet another aspect is a system for automatically logging a viewing event on a screen of a television system the system comprising a television system having a screen, first and second servers, and a database which communicate via a network. The database stores a respective reference data set for each of a multiplicity of reference video segments. The television system is programmed to derive video fingerprints from television signals for a respective portion of a video segment being displayed on the screen. The first server is programmed to: load a multiplicity of contextually targeted display applications in a memory of the television system, each contextually targeted display application having a respective encoded token embedded therein; receive video fingerprints from the television system, the video fingerprints being derived from television signals for respective portions of a video segment being displayed on the screen; search the database to identify a reference data set that most matches the video fingerprint; identify a contextually targeted display application which is associated with the matching reference data set; and send a signal identifying the associated contextually targeted display application to the television system. The TV system is further programmed to send an encoded token embedded in the associated contextually targeted display application to the second server. The second server is programmed to receive and decode the encoded token from the television system and log receipt of the encoded token in a memory.

Other aspects of systems and methods for automatically logging viewing events on Internet-connected televisions are disclosed below.

BRIEF DESCRIPTION OF THE DRAWINGS

FIG. 8 is a flowchart that summarizes a second processing sequence utilized by other embodiments, such as the system depicted in FIG. 4. This processing sequence enables the delivery of more efficient customer support features, including even more robust security features.

Reference will hereinafter be made to the drawings in which similar elements in different drawings bear the same reference numerals.

DETAILED DESCRIPTION

Figure 1A:
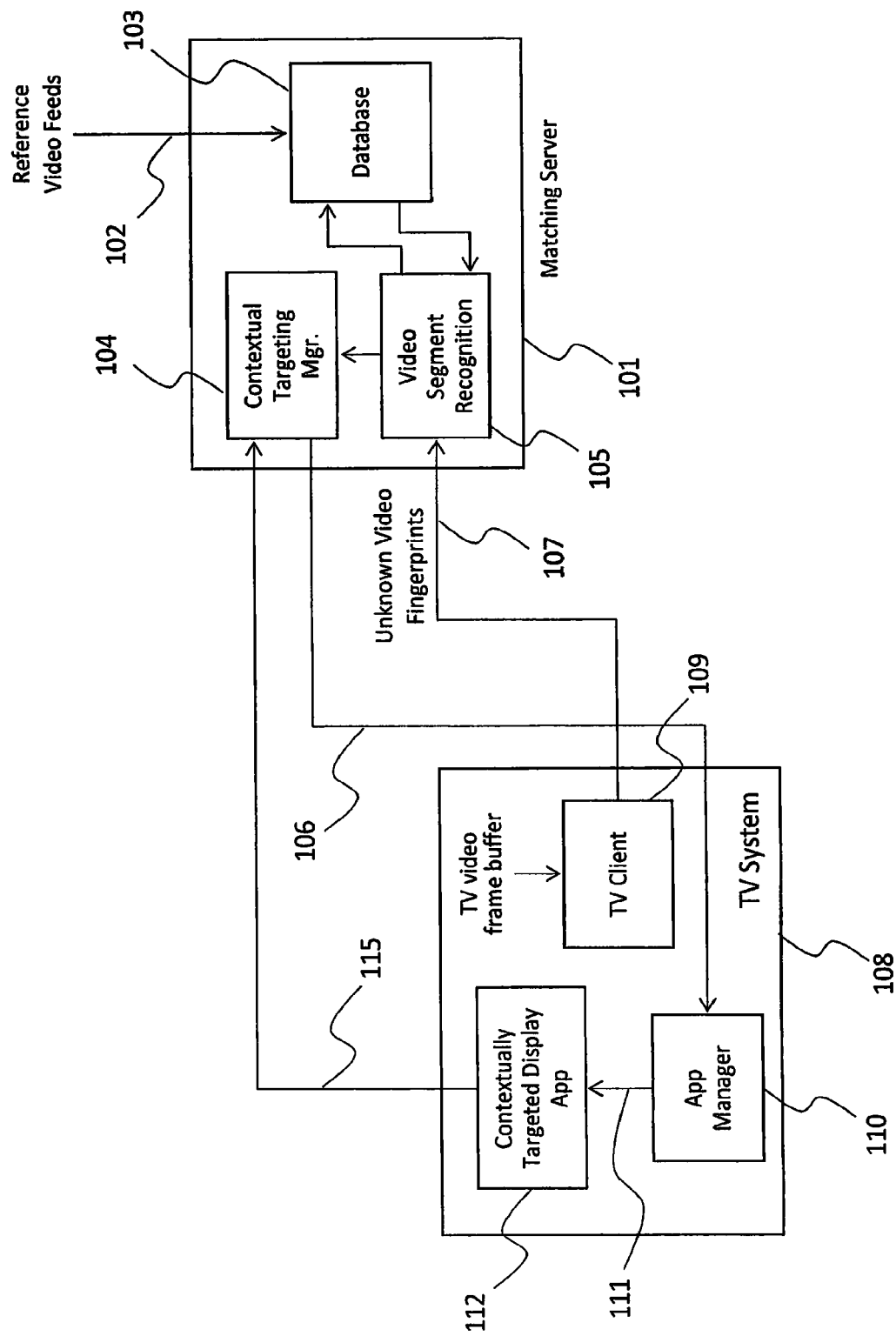
FIG. 1a shows an embodiment enabling specific video segments to be identified by sampling the video frame buffer of a television, creating fingerprints and then comparing those fingerprints to a previously cached database of fingerprints of known programming. If a match is found, the system determines if there is a system event scheduled to be associated with the arrival of the programming and executes the event on the client device while reporting the activity to the central system.

The means of using tracking pixels is a legacy from personal computers and web browsers. When a web browser addresses a web site, the web server sends a program to the web browser in the form of hyper-text markup language (HTML), which itself contains many subprogram modules such as Java, Adobe Flash and JavaScript, among others. Furthermore, these elements often come from different servers.

All of the information (text, graphics, videos) is assembled by the HTML program into a single displaying page within the computer's browser. Within the displayed page will be various windows, some with graphics, some with video. Also, on the web page will be advertisements from various sponsors. The ads themselves are made up of HTML code. This HTML code will also contain Java, Flash, JavaScript and other program elements. This code is supplied to the web site operator by the ad agency representing the advertiser.

Hundreds to thousands of lines of computer code instructs the computer web browser on exactly what text, graphics and video to display, including what fonts to use, what color of text, color of background, precisely where text and pictures are displayed or video windows are positioned. Among the program elements supplied by the ad agency will be a graphic element in JPEG or PNG format, just like what comes from a digital camera, called a 'tracking pixel'. It might be a one-by-one pixel size and set to be 100% transparent so that it does not show in the displayed content. However, when the computer browser executes the HTML code from the web site, when the program gets to the advertisement, the browser calls out across the Internet to the advertiser's servers (one for graphics, one for video (if any), and one for event tracking (auditing)) to get the various elements to form the ad window subsection of the web page. The HTML reads a program element called a GET which instructs the program to call a URL to, among other things, obtain something needed for the rendering and display of a webpage. When executing this instruction (i.e., go get the graphic element at the URL address), it makes a call to the advertiser's server (hereinafter "ad server") at that URL address. That ad server then sends the element (the tracking pixel, in this example) back to the web browser of the client system. The display of the tracking pixel is irrelevant but the act of the ad server responding to the GET call from the web browser of the client system causes an event to be logged that tells the advertiser that an ad was displayed on a web page in, for example, Weehawken, N.J. The ad server will also log the time and date of the request.

This means of auditing advertisements allows a high degree of confidence in the system compared to a web site operator merely reporting back to the advertiser the number of times a web page was displayed. However, the web site operator also wants to know how many times the ad was displayed so it can track its own advertisement billing. Due to the complexities of web servers and web browser, a server may send one or more pages of HTML but not all of it gets displayed, so in the case of the example above, neither the web site operator nor the advertiser could know how often the ad had been displayed from only statistics of the web site operator's servers sending out the HTML code upon the request of a web browser in some home.

In accordance with the systems disclosed hereinafter, the foregoing tracking pixel methodology is extended to smart TVs that contain a small computer or processor programmed to execute a web browser application. This computer system inside the TV system can take over the screen of the TV and display the very same content one sees on a personal computer. However, the use of this computer system is usually toward providing a "walled garden" of pre-programmed applications very similar to a smart phone. Such pre-loaded programs (applications) might be an application to watch movies from over the Internet or an application to get the latest news. The resulting user experience is almost identical to a smart phone or iPad experience. In reality, these applications are basically just pre-packaged web scripts usually written in HTML. When the application runs, it invokes a software program call to a web server to send all the information needed to display the web page. Of course, the information received from web site operator by the smart TV is in a format suitable for a larger display 10 feet from the viewer as opposed to an iPad held in one's hands. This programmatic means by itself could not be applied to live television as this Internet language of HTML was intended as a static means of linking information from multiple computers (not to be confused with the ability of webpages to display video within windows on said web page).

The novelty of the video tracking pixel disclosed herein stems from using this underlying technology of tracking pixels, but extending its utility into video by applying video matching whereby the act of identifying a video segment by a video matching means can be used to trigger a program to run in the computer system of a smart TV or set-top box. When that program runs, part of its program code addresses a distant computer server to request that the server send a graphic element back to the program operating in the smart TV or set-top box. The system of video tracking pixels is using existing Internet programmatic language and existing Internet server means used for the prior art of webpage tracking pixels.

The uses of tracking pixels in the context of television provides a means for a third party to verify that a video segment of interest to the third party has been displayed on a television. Again, this video segment of interest could be an advertisement of a company's product or an advertisement of a competitor's product. For example, Competitor A, the Ford Motor company, might like to know how many times an ad of a Competitor B, the Toyota Motor Company, is seen in a particular market. Competitor A can obtain this information by contracting the video tracking pixel service to place an application in every smart TV in a market area of interest, e.g., New York City metropolitan area, that triggers every time a Competitor B ad is displayed on the respective TV. In other uses, if the application that is triggered in the home displays contextually targeted information (information that appears on the television screen in a pop-up window), this event is audited by the same means as the previous example of simply detecting the display of a video segment of interest. That is, the video tracking pixel provides an independent means for the customer of a contextually targeted information service to verify the delivery to and subsequent display of the service to a multiplicity of televisions.

Current means of auditing the display of television programming or advertisements are inexact because, for instance, the buyer of a TV ad spot only knows how many times that buyer's ad was broadcast but not how many TV sets were on and tuned to the channel when the ad was aired. Several companies have devised means to statistically measure household TV viewing events but this is a very inexact science and cannot accurately measure actually viewing. For instance, at a commercial break, the viewer might tune away to check another channel and miss the advertisement. By means of the video tracking pixel methodology disclosed in detail below, the actual viewing of the ad (or any video segment of interest) can be measured. If the ad involves contextually targeted information, the display of this additional information can likewise be verified.

Methods for matching viewed video with reference video stored in a database will now be described with reference to FIGS. 1a and 1b, which depict, on a high level, components of systems for enabling specific video segments to be identified by sampling the video frame buffer of a television. The systems shown in FIGS. 1a and 1b represent useful examples to provide background for additional embodiments of systems and methods disclosed below with reference to FIGS. 2-4.

Figure 1B:
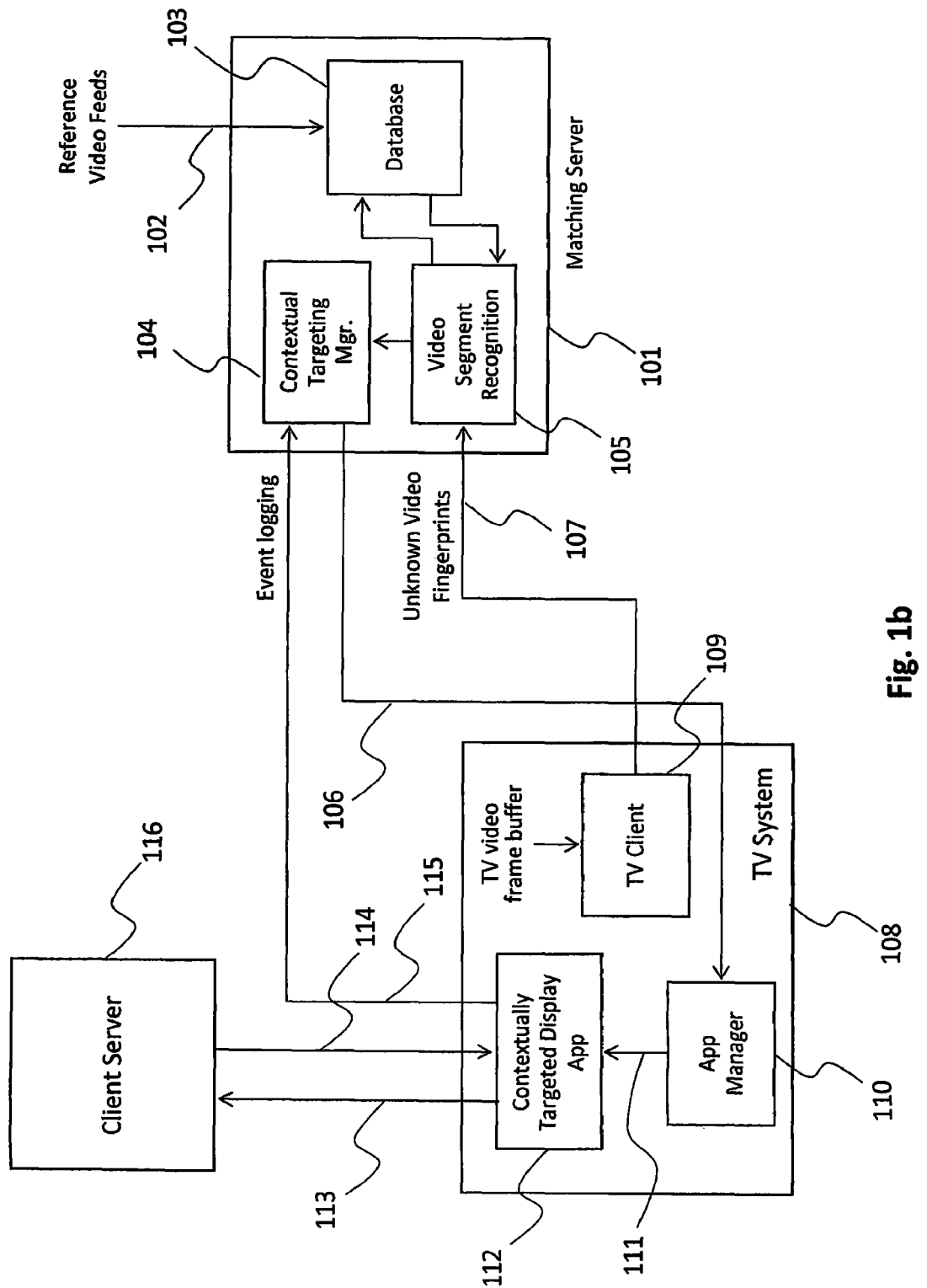
FIG. 1b shows an embodiment of a system and method for enabling a commercial client of the system to monitor specific television programming consumption in real-time, including the viewing of interactive information displayed locally by the television client, using an approach analogous to how Internet websites use tracking pixels to monitor and record specific user's viewing of web pages.

As can be seen in FIG. 1a, a matching server 101 (of a matching server system) receives reference video feeds 102 of a plurality of TV channels or other video information, such as feature films or archival video footage, and builds a reference database 103 of their digital fingerprints that is stored in a computer memory. The fingerprints are composed of samples of at least a subset of the received video frames. These samples may be, but are not limited to, one or more video sub-areas of a video frame further processed by averaging or other techniques known to those skilled in the art.

The matching server 101 preferably comprises a multiplicity of centrally located matching servers, only one of which is depicted in FIG. 1a. Each matching server may in turn comprise a multiplicity of processors programmed to perform different functions, such video segment recognition and contextual targeting management. Each matching server in turn may communicate with a respective multiplicity of remotely located TV systems, only one of which is depicted in FIG. 1a. The system partly depicted in FIG. 1a (and the systems partly depicted in FIGS. 1b and 2-4) will be described with reference to a single TV system communicating with a single matching server, although it should be understood that in practice multiple TV systems will communicate with multiple matching servers.

Referring to FIG. 1a, the remotely located TV system 108 is capable of communicating with the matching server 101 via communication channels 106, 107 and 115 (e.g., the Internet). The TV system 108 may be a smart TV or a TV monitor with an external set-top controller. Video programming from a TV video frame buffer (not shown in FIG. 1a) is received by a TV client 109. The TV client 109 is a software application operating in the computer or processor of TV System 108. The TV system samples the data from the TV video frame buffer and generates unknown (i.e., not yet identified) video fingerprints which are sent via communication channel 107 to the matching server 101 to be matched with data in the reference database 103.

More specifically, the video fingerprints that result from the processing in the TV system 108 are passed via communication channel 107 to a video segment recognition processor 105 that is part of the matching server 101. The fingerprints of the unknown video are generated by the TV client 109 using an algorithm which is similar to the algorithm used by the matching server 101 to store the reference videos in the reference database 103. The video segment recognition processor 105 continuously searches the reference database 103, attempting to find a match of the incoming video fingerprints using a search means according to methods known in the art such as the method taught by Neumeier et al. in U.S. Pat. No. 8,595,781, the disclosure of which is incorporated by reference herein in its entirety. When video segment recognition processor 105 finds a match of a known fingerprint in reference database 103 with an unknown fingerprint of a video segment received from TV system 108, the video segment recognition processor 105 sends a message to a contextual targeting manager 104 identifying the video segment being displayed by the TV system 108. (As used herein, the term "manager" refers to a processor or computer programmed to execute application software for performing a data management or data processing function.) The contextual targeting manager 104 determines what, if any, events are to be associated with the detection of the newly identified video fingerprint from TV client 109. Upon determining the appropriate response, the contextual targeting manager 104 sends a coded trigger to an application manager 110 of the TV system 108 via communication channel 106. (The application manager 110 is software running on the same processor in TV system 108 that the TV client software is running on.) The application manager 110 launches and triggers or otherwise signals the specific application that has been determined to be associated with that event.

More specifically, the application manager 110 sends a trigger signal to a contextually targeted display application 112 via a communication channel 111. The TV system 108 may be loaded with multiple contextually targeted display applications. (The contextually targeted display application 112 is software running on the same processor in TV system 108 that the TV client software is running on.) In one example, a contextually targeted display application 112 may be invoked to display a related graphic image overlaid on the video screen of the TV system 108 with information related to, for example, a television advertisement currently being displayed. The graphic overlay comes from either an embedded graphic stored within the contextually targeted display application (previously downloaded from the contextual targeting manager 104). Or the image can come from an external website when the contextually targeted display application renders the overlay. Similar to a web browser, the contextually targeted display application can contain URLs that point to external web sites for requesting graphics and/or videos.

Following display of the overlay, the contextually targeted display application 112 sends an event complete message via communication channel 115 to the contextual targeting manager 104, which records occurrence of the action. This last step is useful when an advertiser or another third party wishes to receive confirmation of the display on a TV system 108 of the contextually targeted additional information overlay or even just that a video segment, such as an advertisement or public service announcement, has been displayed. In these cases, the contextual targeting manager 104 might provide, for example, a log file of occurrences by time and location to a third party.

FIG. 1*b* shows how one embodiment of the system would operate if configured in a way similar to how many Internet websites monitor content consumption. Video programming from a TV video frame buffer of TV system 108 is received by the TV client 109. As previously noted, the TV client 109 is a software application operating in the computer or processor of TV System 108, which is a smart TV or a TV monitor with an external set-top controller. The video stream is processed according to methods known in the art such as taught by Neumeier et al. in U.S. Pat. No. 8,595,781.

The TV client 109 being monitored sends video fingerprints of what is being viewed, consisting of multiple samples per second of the unknown programming being displayed on the TV 109, to the matching server 101. These video fingerprints, which contain "clues" regarding the video segment being viewed, are sent via communication channel 107 to the video segment recognition processor 105, which attempts to match the "clues" with data in the reference database 103 to identify the programming being viewed and a specific segment of the same in the samples sent, and then passes a token pointing to that information and the associated metadata for it to the contextual targeting manager 104. If and when such a segment of interest is identified, the contextual targeting manager 104 then determines what, if any, actions are to be performed. That determination is sent via communication channel 106 to the application manager 110 of TV system 108, which routes the information (e.g., in the form of a software script) via a communication channel 111 to the contextually targeted display application 112. The contextually targeted display application 112 then sends a request for a piece of content to display via a communication channel 113 (e.g., the Internet) to an address based on a URI embedded in the software script that was provided by the application manager 110. This request addresses a client server 116 somewhere on the Internet. The location of the client server 116 is not material to the process disclosed herein (i.e., the client server 116 can be located anywhere). The client server 116 returns a data item, perhaps a small graphic (i.e., tracking pixel) with transparent pixels (e.g., a .png file), via a communication channel 114. Upon receipt of this data item, the contextually targeted display application 112 assembles the remainder of the display elements, if any, and presents an image on the screen of the TV system 108, much like a web page is made up of addressable elements to be assembled by a web browser for display on a screen of a personal computer. The request for the specific graphic element sent via communication channel 113 by the contextually targeted display application 112 provides information to the commercial client's server 116 that the TV system 108 has viewed the video segment of interest and that a contextually related graph overlay has been presented. For example, the client server 116 may log that event when it sends the tracking pixel via communication channel 114 in response to receipt of a GET call via communication channel 113. (As previously noted, the tracking pixel is not displayed on the TV system. The primary purpose for sending the tracking pixel in response to the GET call is to complete the request so that the GET call will not be repeated.)

Another task of the contextually targeted display application 112 might be to pass a confirmation (i.e., event logging) message via communication channel 115 back to the matching server 101 to be logged for perhaps billing purposes or network reliability monitoring. The disadvantage of this embodiment is that it requires that the commercial client be an active participant in the process, burdened with maintaining its own client server 116 with a database of graphic elements (also known to the art as tracking pixels) while logging specifics of the video segment matches found based on the received requests for the graphics.

Optionally, a particular contextually targeted display application 112 can be triggered to send a request for a tracking pixel, with other information including a TV system identifier, location, etc., without requesting any content to be displayed in a graphic overlay on the TV screen. Since the request for a tracking pixel was triggered by the matching server 102 identifying an associated video segment being viewed, the client server 116 could log that event (i.e., the display of the identified video segment on the identified TV system) upon receipt of the request for tracking pixel. This methodology would allow a client server to determine the number of TV systems which viewed a particular video segment within a region of interest even when contextually targeted material is not being supplied.

Figure 2:
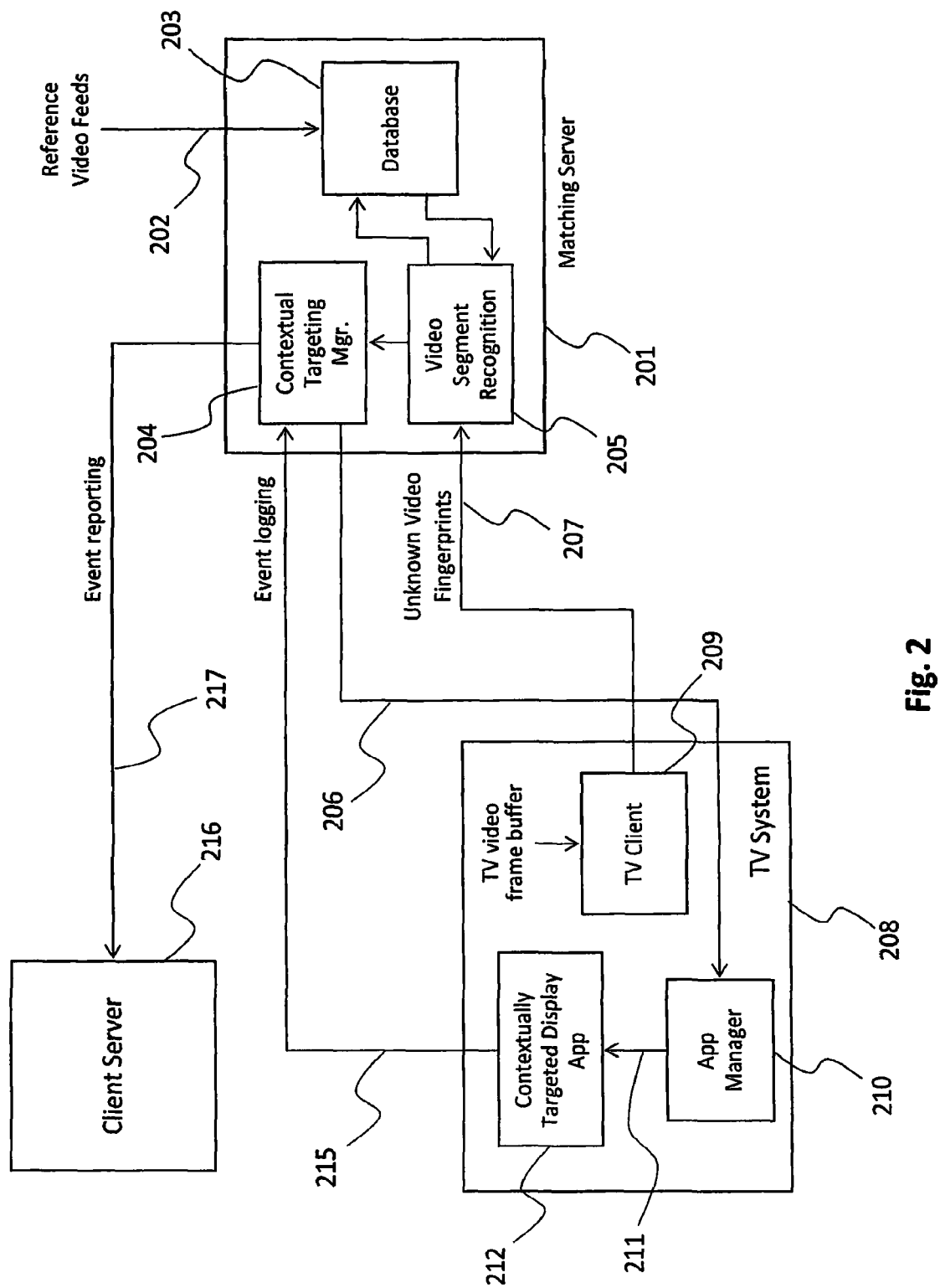
FIG. 2 shows an embodiment of a system and a method for enabling real-time identification of specific television programming consumption by a service provider and then returning that information to a commercial client of the system without the client's involvement.

FIG. 2 depicts how another embodiment of the system would operate if configured in a way to offload the administrative burden for the commercial client of maintaining databases of graphic elements ("tracking pixels") and corresponding access logging means on the client server 216. Video programming from a TV video frame buffer (not shown in FIG. 2) is received by a TV client 209. The TV system 208 samples the data from the TV video frame buffer and generates unknown (i.e., not yet identified) video fingerprints. The fingerprints of the unknown video are generated by the TV client 209 using an algorithm which is similar to the algorithm used by the matching server 201 to store the reference videos in the reference database 203. The video fingerprints contain "clues" regarding what is being viewed consisting of multiple samples per second of the unknown programming being displayed on the screen of the TV system 208. These clues are sent via communication channel 207 to the matching server 201 to be matched with data in the reference database 203. More specifically, the clues that result from the processing in the TV system 208 are passed via communication channel 207 to the video segment recognition processor 205. The video segment recognition processor 205 continuously searches the reference database 203 attempting to find a match of the incoming video fingerprints. When video segment recognition processor 205 finds a match of a known fingerprint in reference database 203 with an unknown fingerprint of a video segment received from TV system 208, the video segment recognition processor 205 sends a message to a contextual targeting manager 204 identifying the video segment being displayed by the TV system 208. The contextual targeting manager 204 determines what, if any, events are to be associated with the detection of the newly identified video fingerprint from TV client 209. Upon determining the appropriate response, the contextual targeting manager 204 sends a coded trigger to an application manager 210 of the TV system 208 via communication channel 206. The application manager 210 launches and triggers or otherwise signals the specific contextually targeted display application 212 that has been determined to be associated with that trigger and event. More specifically, the application manager 210 sends a trigger signal to a contextually targeted display application 212 via a communication channel 211. In one example, a contextually targeted display application 112 may be invoked to display a related graphic image overlaid on the video screen of the TV system 208 with information related to, for example, a television advertisement currently being displayed. The contextually targeted display application 212 sends an event complete message via communication channel 215 to the contextual targeting manager 204, which records occurrence of the action for internal tracking and accounting purposes. The contextual targeting manager 204 also sends a confirmation report via communication channel 217 (e.g., the Internet) to the client server 216 to confirm the detection of the video segment displayed on TV system 208. While reasonably efficient, this embodiment lacks the ability to support the needs of the commercial client to ensure sufficient accuracy of the video identification information received.

Figure 3:
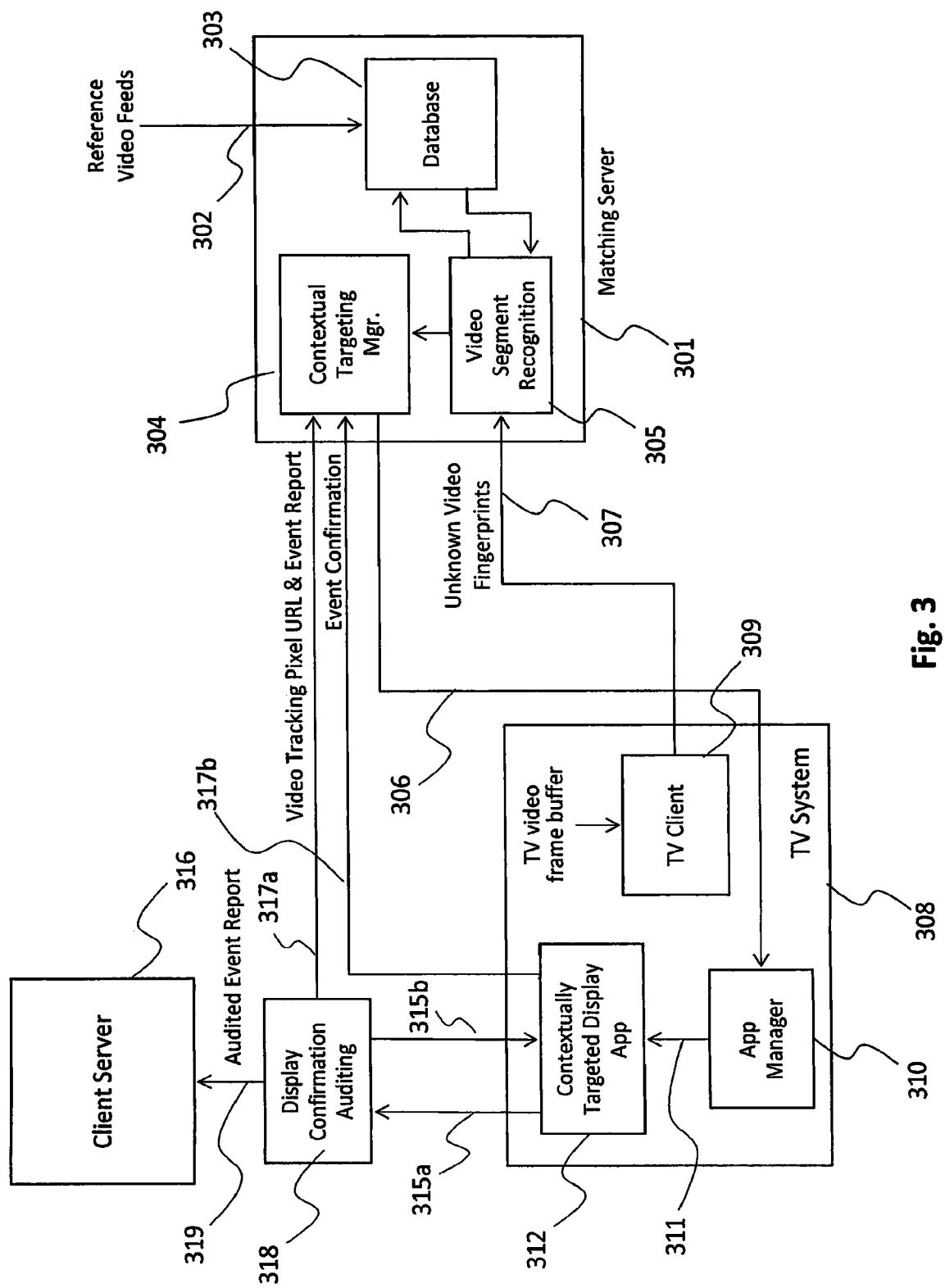
FIG. 3 shows a preferred embodiment of a system and method for enabling real-time identification of specific television programming consumption and returning that information in the form of a cookie to a commercial client of the system through a trusted third-party intermediary service in order to confirm delivery, with secondary confirmation returned to the system to verify the third-party's report.

FIG. 3 shows how a particularly advantageous embodiment of the system would operate when configured in a way that interposes a display confirmation auditing server 318 as part of the process This enables the commercial client server 316 to obtain independent verification of the numbers of "hits" or viewings of their advertisement or some other particular video segment. Although the display confirmation auditing server 318 is shown separate from the client server 316 in FIG. 3, the two servers may be combined into one server. In the case where the display confirmation auditing server is separate, server 318 may be operated by a trusted third party.

Still referring to FIG. 3, video programming from a TV video frame buffer (not shown in FIG. 3) is received by a TV client 309. The TV system 308 samples the data from the TV video frame buffer and generates unknown (i.e., not yet identified) video fingerprints. The fingerprints of the unknown video are generated by the TV client 309 using an algorithm which is similar to the algorithm used by the matching server 301 to store the reference videos in the reference database 303. The video fingerprints contain "clues" regarding what is being viewed consisting of multiple samples per second of the unknown programming being displayed on the screen of the TV system 308. These clues are sent via communication channel 307 to the matching server 301 to be matched with data in the reference database 303. More specifically, the clues that result from the processing in the TV system 308 are passed via communication channel 307 to the video segment recognition processor 305. The video segment recognition processor 305 continuously searches the reference database 303 attempting to find a match of the incoming video fingerprints. When video segment recognition processor 305 finds a match of a known fingerprint in reference database 303 with an unknown fingerprint of a video segment received from TV system 308, the video segment recognition processor 305 sends a message to a contextual targeting manager 304 identifying the video segment being displayed by the TV system 308. The contextual targeting manager 304 determines what, if any, events are to be associated with the detection of the newly identified video fingerprint from TV client 309. Upon determining the appropriate response, the contextual targeting manager 304 sends a coded trigger to an application manager 310 of the TV system 308 via communication channel 306. The application manager 310 launches and triggers or otherwise signals the specific contextually targeted display application 312 that has been determined to be associated with that event. More specifically, the application manager 310 sends a trigger signal to that contextually targeted display application 312 via a communication channel 311. In one example, a contextually targeted display application 312 may be invoked to display a related graphic image overlaid on the video screen of the TV system 308 with information related to, for example, a television advertisement currently being displayed. The contextually targeted display application 312 is programmed to notify the confirmation auditing server 318 via communication channel 315a that the video segment of interest (typically identified by its time stamp and associated metadata provided by the matching server 301) has been viewed by a certain TV system 308 that has been appropriately identified by device, time, location, or other information through the associated metadata. This notification may include a request that the client server 316 (maintained by the commercial client for the video segment viewing detection service) send a tracking pixel, which tracking pixel is sent via communication channel 315b. The confirmation auditing server 318 in turn passes an audited event report containing a viewing detection event indicator and associated metadata via a communication channel 319 to the client server 316.

Optionally, the contextually targeted display application 312 also sends a confirmation of the event via communication channel 317b to the contextual targeting manager 304, thereby providing a single source for both billing and verification data, for example. Optionally, the confirmation auditing server 318 may also provide a message via a communication channel 317a to the contextual targeting manager 304 indicating that the client server 316 has been notified. This means might be used to maintain an internal display confirmation audit trail of the confirmation auditing server 318.

Figure 4:
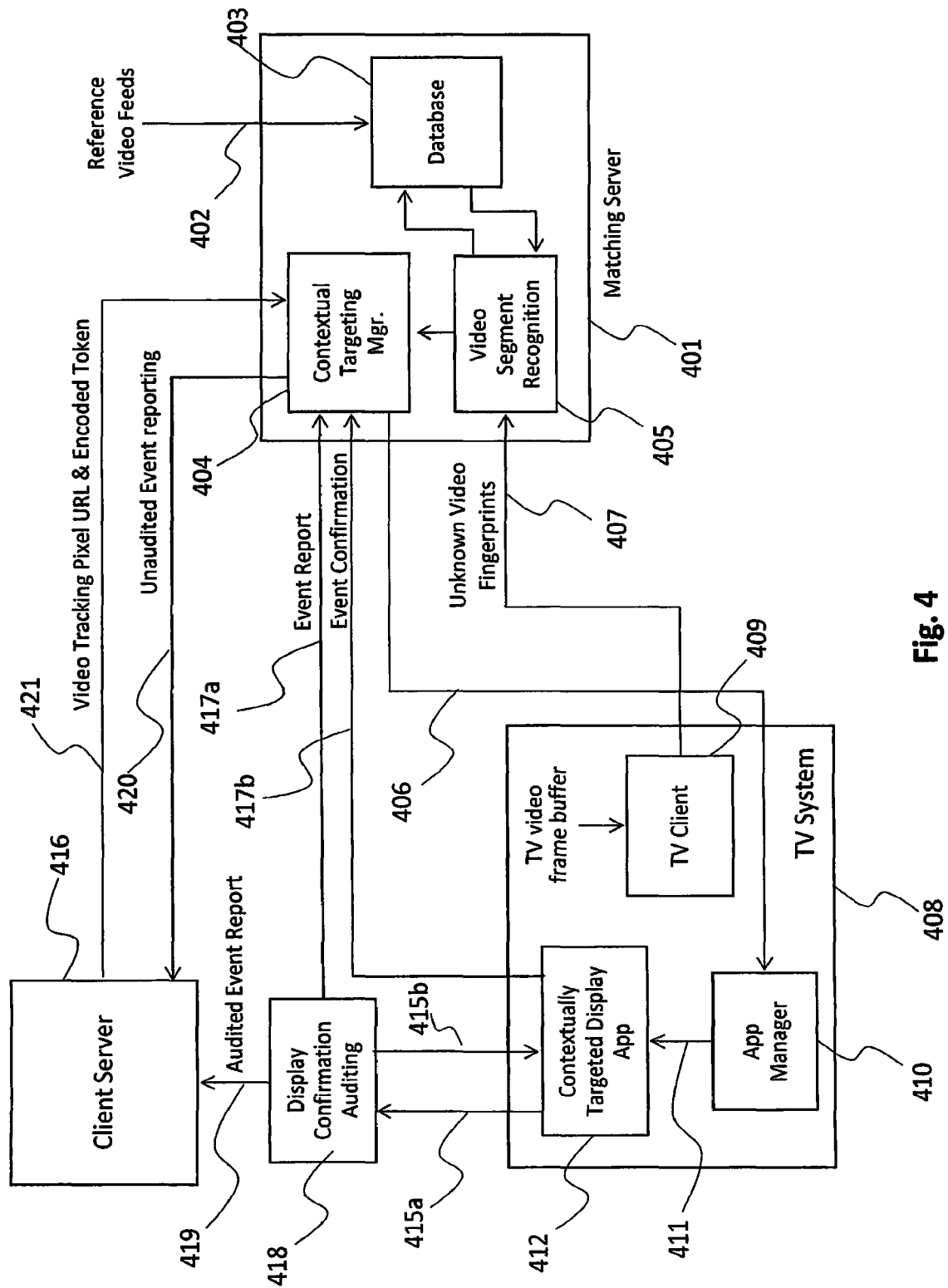
FIG. 4 shows an additional embodiment of a system and method for enabling real-time identification of specific television programming consumption and returning that information to a commercial client of the system through a trusted third-party intermediary service. This embodiment incorporates additional steps to provide control and service verification by the client through the use of encoded tokens managing the display of events according to additional criteria. This is coupled with robust auditing of each involved party's performance using encoded tokens and redundant confirmations that may be cross-checked to enable client verification of service delivery.

FIG. 4 depicts yet another embodiment of the system with certain additional advantages. As seen in FIG. 4, the video client 409 of the TV system 408, such as a television set or other video display means, receives video programming. As in the other embodiments, video programming from a TV video frame buffer (not shown in FIG. 4) is received by a TV client 409. The TV system 408 samples the data from the TV video frame buffer and generates unknown (i.e., not yet identified) video fingerprints. The fingerprints of the unknown video are generated by the TV client 409 using an algorithm which is similar to the algorithm used by the matching server 401 to store the reference videos in the reference database 403. The video fingerprints contain "clues" regarding what is being viewed consisting of multiple samples per second of the unknown programming being displayed on the screen of the TV system 408. These clues are sent via communication channel 407 to the matching server 401 to be matched with data in the reference database 403. More specifically, the clues that result from the processing in the TV system 408 are passed via communication channel 407 to the video segment recognition processor 405. The video segment recognition processor 405 continuously searches the reference database 403 attempting to find a match of the incoming video fingerprints. When video segment recognition processor 405 finds a match of a known fingerprint in reference database 403 with an unknown fingerprint of a video segment received from TV system 408, the video segment recognition processor 405 sends a message to a contextual targeting manager 404 identifying the video segment being displayed by the TV system 408. The contextual targeting manager 404 determines what, if any, events are to be associated with the detection of the newly identified video fingerprint from TV client 409. Upon determining the appropriate response, the contextual targeting manager 404 sends a coded trigger to an application manager 410 of the TV system 408 via communication channel 406. The application manager 410 launches and triggers or otherwise signals the specific application that has been determined to be associated with that event.

More specifically, the video segment recognition processor 405 attempts to match the received clues to the reference data in the database 403 to identify the programming and specific segment of same in the samples sent, and passes a token pointing to that information and the associated metadata for it to the contextual targeting manager 404. If and when such a segment of interest is identified, the contextual targeting manager 404 then determines what, if any, actions are to be performed. When an action is to take place on the TV system 408, that determination is sent via communication channel 406 to the application manager 410 along with a token and/or encryption seed (public key value) received from the client server 416 via a communication channel 421. The token and/or encryption seed may subsequently be used by client server 416 to uniquely identify, for verification or other purposes, any event, action, or metric associated with the token. The application manager 410 then routes that information via communication channel 411 to the contextually targeted display application 412, which then displays a related graphic image overlaid on the video screen of the TV system 408. The contextually targeted display application 412 is programmed to notify the confirmation auditing server 418 via communication channel 415*a* that the video segment of interest (typically identified by its time stamp and associated metadata provided by the matching server 401) has been viewed by a certain TV system 408 that has been appropriately identified by device, time, location, or other information through the associated metadata. This notification may include a request that the client server 416 send a tracking pixel, which tracking pixel is sent via communication channel 415*b*. The confirmation auditing server 418 in turn passes an audited event report containing a viewing detection event indicator and associated metadata via a communication channel 419 to the client server 416.

Optionally, the contextually targeted display application 412 also sends a confirmation of the event via communication channel 417*b* to the contextual targeting manager 404. Optionally, confirmation auditing server 418 may also provide a message via a communication channel 417*a* to the contextual targeting manager 404 indicating that the client server 416 has been notified. Optionally, the contextual targeting manager 404 sends an unaudited event report to the client server 416 via a communication channel 420.

It will be apparent to one skilled in the art that a token as described above can be gainfully applied to the task of identifying confirmations received by the third-party verification service 418 from the TV system 408. For example, the client server 416 could supply a unique token for each of the top 120 demographic marketing areas (DMA) of the United States. It would then be the responsibility of the matching server 401 to distribute the respective tokens to TV systems residing in the respective DMAs in advance of the anticipated use of the tokens. When the system disclosed herein detects a video segment, such as a TV advertisement, and the TV system 408 is instructed to send a message to the third-party verification service 418, a token identifying the DMA region is passed as part of the message. This assists the client server 416 in classifying the collected data. The tokens can be created for classification tasks in addition to the example of regional identification disclosed herein. Also a plurality of combinations of parameters can be assigned to tokens or multiple tokens can be distributed to the TV systems for any combination of useful metrics.

If the client has supplied an encryption seed as a token or in addition to a token, such as a public key value of a public key/private key encryption pair, the encryption seed may be algorithmically processed by the computing means of the TV system 408 to generate a unique encrypted code that, when passed to the third-party verification service 418, is further passed back to the client server 416 for positive identification of specific TV systems and any video segments viewed upon those specific TV systems.

Figure 5:
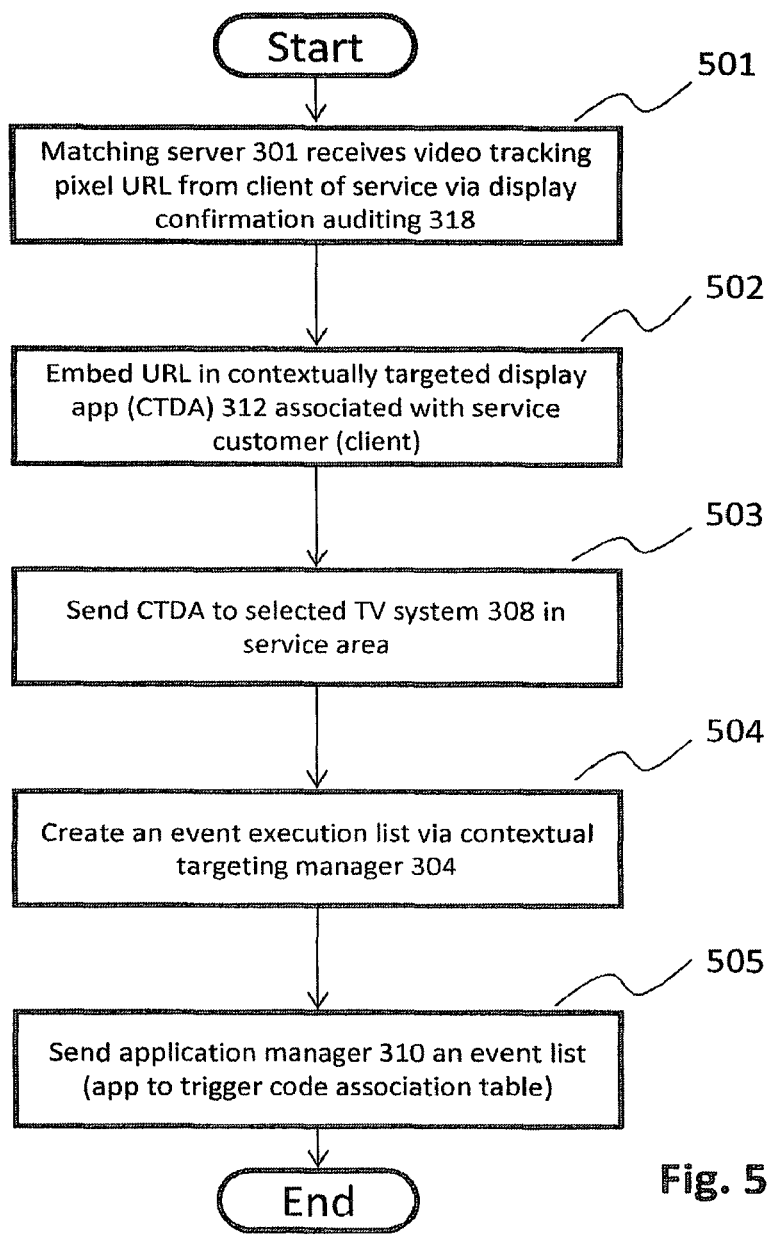
FIG. 5 is a flowchart that summarizes an initial setup processing sequence utilized by certain embodiments, such as the example depicted in FIG. 3. This embodiment uses a video tracking URL to call the client server in a manner analogous to how traditional HTML web pages obtain graphic elements and other files from servers accessed over the Internet.

FIG. 5 presents a flowchart that summarizes a key setup process sequence utilized by certain embodiments, such as the system depicted in FIG. 3. In this flowchart, the process is initiated with a first step 501, which involves the reception of a video tracking pixel universal resource locator (URL) from the client server 316 by the matching server 301 from the display confirmation auditing means 318 via communication channel 317*a*. Then in step 102, this URL is embedded in a contextually targeted display application 312 associated with the commercial customer (i.e., client server 316). In step 503, this contextually targeted display application is then sent to selected TV clients of respective TV systems 308, such as smart TVs or set-top boxes, in the regional, metropolitan, or local viewing area of interest to the commercial customer. In the next step 504, an event execution list is created via the contextual targeting manager 304. The final step 505 in this process is to send application manager 310 (in the targeted TV system 308) an event list which associates event trigger codes from the contextual targeting manager 304 with specific contextually targeted display applications 312 stored in the memory means of the TV system 308. The receipt of an event trigger code from the contextual targeting manager 304 will cause application manager 310 to launch a specific contextually targeted display application 312 associated with that code.

Figure 6:
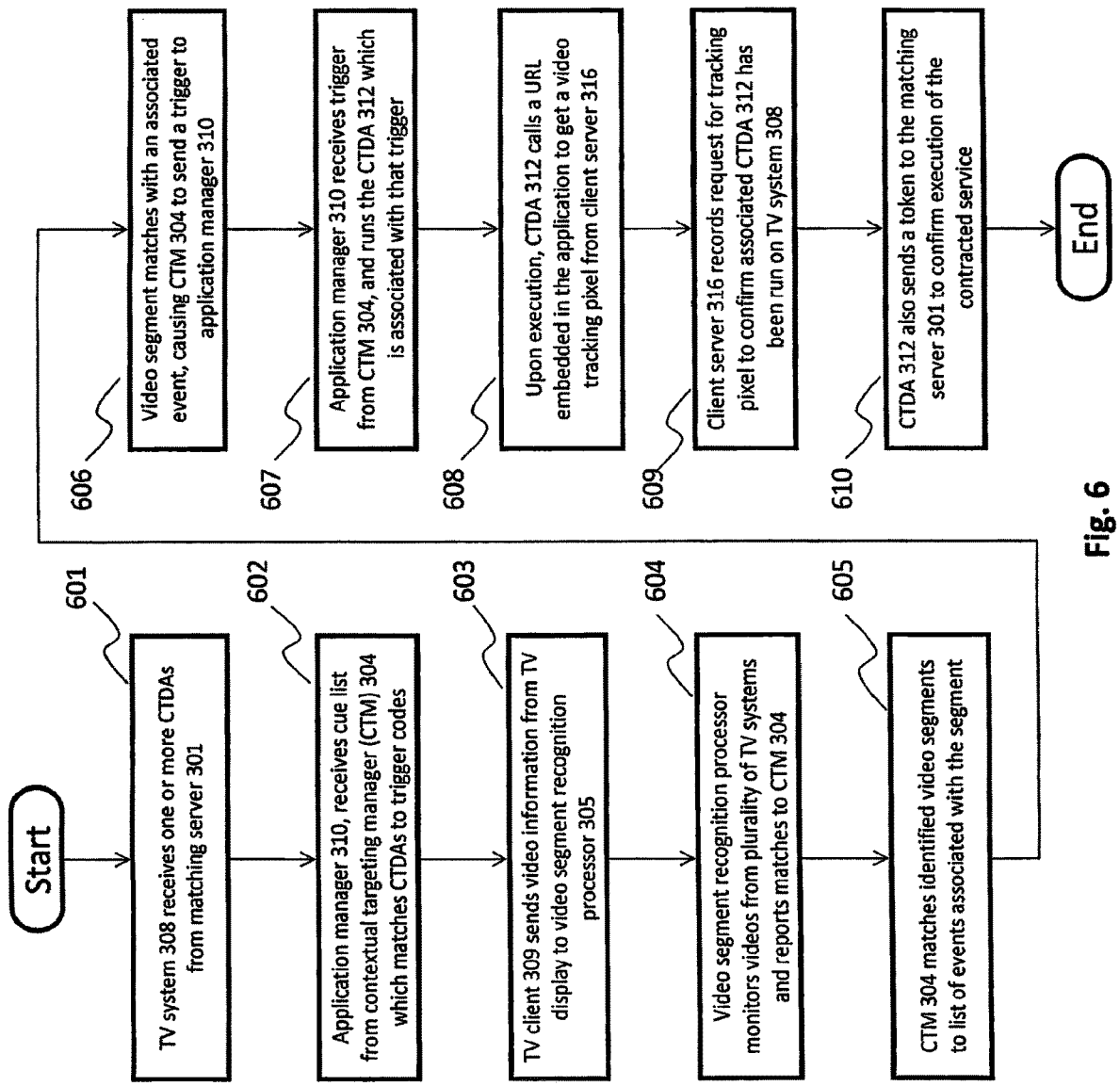
FIG. 6 is a flowchart that summarizes a second processing sequence utilized by certain embodiments, such as the system depicted in FIG. 3. This embodiment enables relatively more robust tracking and confirmation services to be offered to the customer as compared to certain other embodiments.

FIG. 6 shows a flowchart that summarizes a second processing sequence utilized by certain embodiments, an example of which is the system depicted in FIG. 3. As the process starts in step 601, the TV system 308 receives one or more contextually targeted display applications 312 from the matching server 301. In step 602, the application manager 310 receives an event trigger list from contextual targeting manager 304 which matches the contextually targeted display applications to trigger codes sent via contextual targeting manager 304. In step 603, the TV client 309 sends video information from the TV display to the video segment recognition processor 305, which is a subsystem of the matching server 301. In step 604, the video segment recognition processor 305 monitors video from a plurality of TV systems and reports matches of unknown video segments from those TV systems to known video segments stored in a database associated with the matching server 301. The result of this identification (i.e., matching) of the unknown video segments is sent to the contextual targeting manager 304. In step 605, the contextual targeting manager 304 matches identified video segments to a list of events associated with the identified video segment. In step 606, when a particular video segment matches with an associated event, it causes the contextual targeting manager 304 to send a trigger to application manager 310, which is part of the TV system 308. In step 607, when the application manager 310 receives a trigger from the contextual targeting manager 304, application manager 310 launches the contextually targeted display application 312 that has been associated with the received trigger.

FIG. 6 assumes that the display confirmation auditing server 318 is incorporated in the client server 316. In this configuration, upon execution, the contextually targeted display application 312 addresses the URL embedded in the application (step 608) via communication channel 315*a* to obtain the designated video tracking pixel from the client server 316. Step 609 involves the client server 316 sending the tracking pixel via communication channel 315b and recording the request for the tracking pixel to confirm that the associated contextually targeted display application 312 has been run on TV system 308. In step 610, the contextually targeted display application 312 also sends the matching server 301 an event confirmation in the form of a token to confirm execution of the contracted service, completing the process.

Figure 7:
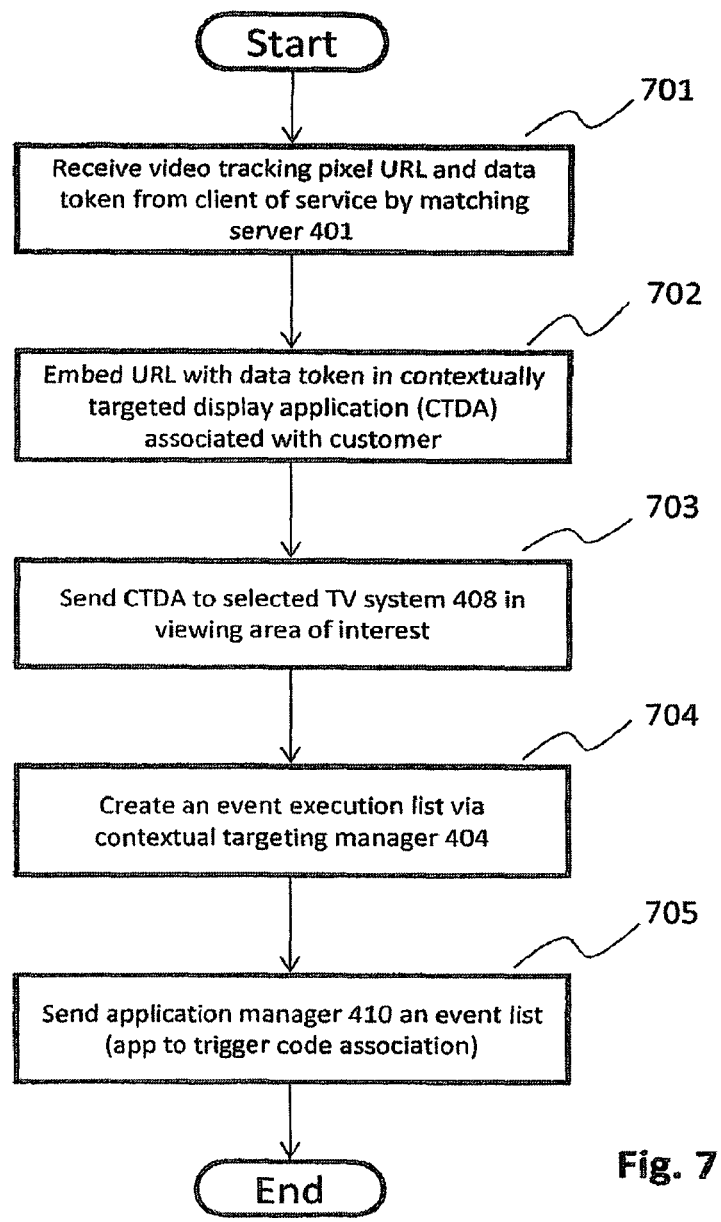
FIG. 7 is a flowchart that summarizes an initial setup processing sequence utilized by certain other embodiments, such as the system depicted in FIG. 4. This embodiment accepts a coded token sent by the customer to provide additional data integrity and auditing capabilities.

FIG. 7 presents a flowchart that summarizes a key setup process sequence utilized by certain embodiments, such as the system depicted in FIG. 4. In this flowchart, the process is initiated by the first step 701, which involves the reception of a video tracking pixel URL from the client server 316 by the matching server 401 via a communication channel 421. In step 702, the URL with an associated data token is embedded in a contextually targeted display application associated with the commercial customer (client server 416) for the service. In step 703, the contextually targeted display application 412 is then sent to a selected TV system 408 in the regional or local viewing area of interest. In the next step 704, an event execution list is created via the contextually targeting manager 404. The final step 705 in this process is to send application manager 410 an event list which associates trigger codes to be received from the contextual targeting manager 404 with contextually targeted display applications to be executed (launched) upon receipt of those trigger codes by the application manager 410.

FIG. 8 shows a flowchart that summarizes a modified processing sequence utilized by certain embodiments, an example of which is the system depicted in FIG. 4. As the process starts in step 801, the application manager 410 receives one or more contextually targeted display applications from the contextual targeting manager 404 of the matching server 401. In step 802, the application manager 410 receives a cue list from the contextual targeting manager 404 which matches contextually targeted display applications to the trigger codes. In step 803, the TV client 409 sends video information from the TV display to the video segment recognition processor 405 in the matching server 401. In step 804, the video segment recognition processor 405 monitors video from a plurality of TV systems and reports identified video segments from those TV systems to the contextual targeting manager 404. In step 805, the contextual targeting manager 404 matches identified video segments to a list of events associated with the identified video segment. In step 806, when a particular video segment matches with an associated event, it causes the contextual targeting manager 404 to send a trigger to application. manager 410 in TV system 408. In step 807, when the application manager 410 receives a trigger from the contextual targeting manager 404, the application manager 410 launches the contextually targeted display application 412 which the application manager 410 determines to be associated with that trigger.

FIG. 8 assumes that the display confirmation auditing server 318 is incorporated in the client server 316. In this configuration, upon execution, the launched contextually targeted display application 412 in step 808 calls the URL embedded in that application and sends a data token that may also be embedded in that application or, alternatively, previously stored in a known location in a memory of the TV system 408. Step 809 involves the client server 416 recording a request for a tracking pixel to confirm that the associated contextually targeted display application 412 has been run on TV system 408. In step 810, the contextually targeted display application 412 also sends an event confirmation in the form of a token to the matching server 401 to confirm execution of the contracted service, completing the process.

While systems and methods have been described with reference to various embodiments, it will be understood by those skilled in the art that various changes may be made and equivalents may be substituted for elements thereof without departing from the scope of the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order (alphabetical ordering in the claims is used solely for the purpose of referencing previously recited steps) or in the order in which they are recited. Nor should they be construed to exclude any portions of two or more steps being performed concurrently or alternatingly.

What is claimed is:

1. A computer-implemented method comprising:
receiving, by a server, a signal indicating a viewing event associated with a media system, wherein the viewing event is based on a determination that a reference data set associated with an identified video segment is similar to data associated with a particular video segment displayed by the media system;
generating, by the server, a viewing detection event indicating the viewing event is associated with the media system, the viewing detection event indicating an occurrence of the viewing event;
sending, by the server, a message including at least one pixel to the media system in response to receiving information indicating content associated with a contextual application is displayed by the media system, the contextual application being associated with the particular video segment; and
storing, by the server, the viewing detection event, wherein the viewing detection event is stored in response to sending the message including the at least one pixel.

2. The computer-implemented method of claim 1, wherein the viewing event includes a display of content associated with a contextual application by the media system.

3. The computer-implemented method of claim 2, wherein the content associated with the contextual application is displayed by the media system in response to an additional signal from a matching server, the additional signal identifying the contextual application based on the determination that the reference data set is similar to the data associated with the particular video segment.

4. The computer-implemented method of claim 1, wherein the viewing event includes the determination that the reference data set is similar to the data associated with the particular video segment.

5. The computer-implemented method of claim 1, wherein the signal indicating the viewing event is sent by a contextual application of the media system to an address of the server, the contextual application having access to the address of the server.

6. The computer-implemented method of claim 1, wherein the particular video segment is identified by a separate matching server.

7. The computer-implemented method of claim 6, wherein the signal indicating the viewing event is sent by the matching server.

8. The computer-implemented method of claim 1, wherein an additional signal is received by a additional server from the media system, and wherein the signal received by the server is sent by the additional server.

9. The computer-implemented method of claim 1, wherein the data associated with the particular video segment includes data sampled from one or more video frames of the particular video segment.

10. The computer-implemented method of claim 1, wherein the signal includes at least one of information indicative of an identity of the media system, information indicative of a geographical location of the media system, or information indicative of content associated with the viewing event.

11. The computer-implemented method of claim 1, wherein the determination that a reference data set associated with an identified video segment is similar to data associated with a particular video segment is performed by a matching server, and wherein the signal indicating the viewing event is received from the matching server.

12. The computer-implemented method of claim 1, further comprising sending, by the server, the message including the at least one pixel in response to receiving a request from the media system for content associated with a contextual application.

13. An apparatus, comprising:
one or more processors implemented in circuitry; and
a non-transitory machine-readable storage medium including instructions, which when executed on the one or more processors, cause the one or more processors to perform operations including:
receiving a signal indicating a viewing event associated with a media system, wherein the viewing event is based on a determination that a reference data set associated with an identified video segment is similar to data associated with a particular video segment displayed by the media system;
generating a viewing detection event indicating the viewing event is associated with the media system, the viewing detection event indicating an occurrence of the viewing event;
sending a message including at least one pixel to the media system in response to receiving information indicating content associated with a contextual application is displayed by the media system, the contextual application being associated with the particular video segment; and
storing the viewing detection event, wherein the viewing detection event is stored in response to sending the message including the at least one pixel.

14. The apparatus of claim 13, wherein the viewing event includes a display of content associated with a contextual application by the media system.

15. The apparatus of claim 14, wherein the content associated with the contextual application is displayed by the media system in response to an additional signal from a matching server, the additional signal identifying the contextual application based on the determination that the reference data set is similar to the data associated with the particular video segment.

16. The apparatus of claim 13, wherein the viewing event includes the determination that the reference data set is similar to the data associated with the particular video segment.

17. The apparatus of claim 13, wherein the signal indicating the viewing event is sent by a contextual application of the media system to an address of the apparatus, the contextual application having access to the address of the apparatus.

18. The apparatus of claim 13, wherein the particular video segment is identified by a separate matching server, and wherein the signal indicating the viewing event is sent by the matching server.

19. A non-transitory computer-readable medium having stored thereon instructions that, when executed by one or more processors, cause the one or more processors to:
receive a signal indicating a viewing event associated with a media system, wherein the viewing event is based on a determination that a reference data set associated with an identified video segment is similar to data associated with a particular video segment displayed by the media system;
generate a viewing detection event indicating the viewing event is associated with the media system, the viewing detection event indicating an occurrence of the viewing event;
send a message including at least one pixel to the media system in response to receiving information indicating content associated with a contextual application is displayed by the media system, the contextual application being associated with the particular video segment; and
store the viewing detection event, wherein the viewing detection event is stored in response to sending the message including the at least one pixel.

* * * * *